United States Patent

Tanaka et al.

Patent Number: 4,518,764
Date of Patent: May 21, 1985

[54] DIALLYL TEREPHTHALATE COPOLYMER AND COMPOSITION COMPRISING SAID COPOLYMER

[75] Inventors: Motomu Tanaka, Kobe; Masanari Osuka, Toyonaka; Takeshi Kuri, Nishinomiya; Sadao Takakuwa, Suita, all of Japan

[73] Assignee: Osaka Soda Co. Ltd., Osaka, Japan

[21] Appl. No.: 546,533

[22] Filed: Oct. 28, 1983

[30] Foreign Application Priority Data

Oct. 30, 1982 [JP] Japan .................... 57-189981
Jan. 24, 1983 [JP] Japan .................... 58-10056

[51] Int. Cl.³ ............................. C08G 83/00
[52] U.S. Cl. ......................... 528/271; 528/392
[58] Field of Search .................... 528/271, 392

[56] References Cited

U.S. PATENT DOCUMENTS 2,433,616 12/1947 Marple et al. ............. 528/271
3,523,928 8/1970 Blanchard ............... 528/271

Primary Examiner—Harold D. Anderson
Attorney, Agent, or Firm—Sherman & Shalloway

[57] ABSTRACT

A diallyl terephthalate copolymer derived from diallyl terephthalate represented by the following formula

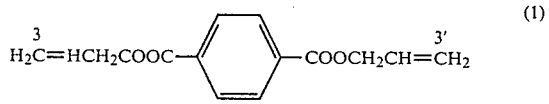

and an aromatic hydrocarbon having at least one hydrogen atom at the benzyl position and represented by the following formula

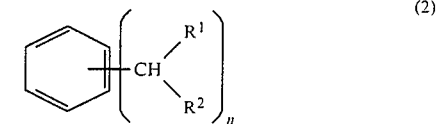

wherein each of $R^1$ and $R^2$ represents a member selected from the class consisting of a hydrogen atom and lower alkyl groups, and n is an integer of 1 to 3, said copolymer having the following characteristics (a) to (f):

(a) the copolymer has such a structure that at the terminals of the monomeric unit of formula (1), one monomeric unit of formula (2) is bonded to the allyl group of the monomeric unit of formula (1) at

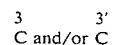

through a carbon-carbon bond at the benzyl position, (b) the number of the monomeric units of formula (1) at a carbon-carbon bonded molecular chain segment formed of the allyl groups of the monomeric unit of formula (1) in the copolymer is from 3 to 11, (c) the copolymer has a degree of unsaturation, represented by its iodine value measured by the Wijs method, of from 40 to 85, (d) the copolymer has a true specific gravity at 30° C. of from 1.20 to 1.25, (e) the copolymer has a number average molecular weight ($\overline{Mn}$) of from 4,000 to 10,000 and a weight average molecular weight ($\overline{Mw}$) of from 70,000 to 200,000 when they are measured by gel-permeation chromatograph (GPC) and calculated as polystyrene, and (f) the copolymer has a molecular weight distribution, represented by the ratio of $\overline{Mn}$ to $\overline{Mw}$, of from 10 to 40.

9 Claims, 1 Drawing Figure

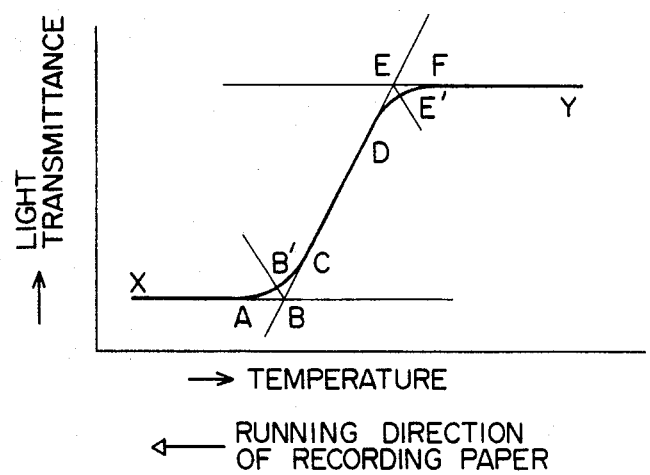

DIALLYL TEREPHTHALATE COPOLYMER AND COMPOSITION COMPRISING SAID COPOLYMER

This invention relates to a novel copolymer of diallyl terephthalate with an aromatic hydrocarbon which has improved flexural strength, markedly improved impact strength and other improved properties while substantially retaining the desirable properties of a diallyl terephthalate polymer. Specifically, this invention relates to a diallyl terephthalate copolymer which is not described in the prior literature and which is derived from diallyl terephthalate and an aromatic hydrocarbon having at least one hydrogen atom at the benzyl position. This copolymer has a high level of dimensional stability, excellent rigidity under heat, excellent heat resistance, excellent electrical properties and particularly high impact strength and can be easily molded. It is useful, for example, as engineering plastics. The invention also pertains to a process for producing this copolymer, and a resin composition comprising this copolymer.

More specifically, this invention relates to a diallyl terephthalate copolymer derived from diallyl terephthalate represented by the following formula

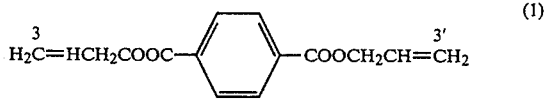

(1)

and an aromatic hydrocarbon having at least one hydrogen atom at the benzyl position and represented by the following formula

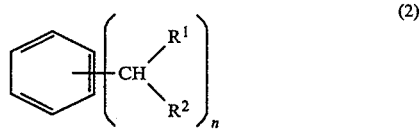

(2)

wherein each of $R^1$ and $R^2$ represents a member selected from the class consisting of a hydrogen atom and lower alkyl groups, and n is an integer of 1 to 3, said copolymer having the following characteristics (a) to (f):

(a) the copolymer has such a structure that at the terminals of the monomeric unit of formula (1), one monomeric unit of formula (2) is bonded to the allyl group of the monomeric unit of formula (1) at

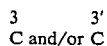

through a carbon-carbon bond at the benzyl position, (b) the number of the monomeric units of formula (1) at a carbon-carbon bonded molecular chain segment formed of the allyl groups of the monomeric unit of formula (1) in the copolymer is from 3 to 11, preferably from 3 to 10.

(c) the copolymer has a degree of unsaturation, represented by its iodine value measured by the Wijs method, of from 40 to 85, preferably from 45 to 80, (d) the copolymer has a true specific gravity at 30° C. of from 1.20 to 1.25, preferably from 1.21 to 1.25, (e) the copolymer has a number average molecular weight ($\overline{M}n$) of from 4,000 to 10,000 and a weight average molecular weight ($\overline{M}w$) of from 70,000 to 200,000 when they are measured by gel-permeation chromatography (GPC) and calculated as polystyrene, and (f) the copolymer has a molecular weight distribution, represented by the ratio of $\overline{M}n$ to $\overline{M}w$, of from 10 to 40.

Preferably, the novel copolymer of this invention additionally has at least one of the following characteristics (g) to (k).

(g) The copolymer has a softening temperature in the range of from about 50° C. to about 120° C., preferably from about 60° C. to about 110° C., more preferably from about 70° C. to about 100° C.

(h) The copolymer has a viscosity, determined for its 50% methyl ethyl ketone solution at 30° C., of from 80 to 300 centipoises.

(i) The copolymer has a Brabender melt viscosity, measured by Brabender plastography, of from 250 to 2,600 m.g., preferably from 400 to 2,500 m.g., and the processing time of from 5 to 65 minutes.

Diallyl phthalate resins have previously found extensive use in fields which require high reliability, because these resins have excellent mechanical properties such as dimensional stability and rigidity under heat, excellent heat resistance and excellent electrical properties. On the other hand, these resins have the disadvantage of being brittle and having insufficient toughness. In recent years, small-sized molded articles of the diallyl phthalate resins have frequently shown cracking or chipping at their thin-walled portion or small protruding portions.

Many proposals have been made heretofore to overcome these technical problems by improving the blending technique or remedying the brittleness of the diallyl phthalate resins. For example, a method involving reinforcing the resins with a filler such as glass fibers, and a method involving modifying the resins with polyesters or rubbery polymers having flexibility are known. In spite of the fact that these methods are intended to impart toughness without impairing the excellent properties of the diallyl phthalate resins, they have not been able to achieve the intended objective.

For example, according to the method using the filler, long fibers as the filler must be left in the molded articles, and for this purpose, the method of kneading and the method of molding are greatly restricted. Hence, this method is not practical. With the modifying method, an undue deterioration usually occurs in at least one of dimensional stability, heat resistance, mechanical strength, electrical properties and moldability. Thus, the previously proposed methods can achieve only limited improvements. To achieve a fully satisfactory improvement, it is no longer possible to rely on the prior methods.

On the other hand, there has been a tremendous advance in thermoplastic resins including polybutylene terephthalate (PBT) and polyphenylene sulfide (PPS), and thermoplastic resins having excellent heat resistance and electrical properties and improved compounding techniques have been developed. Owing partly to the good productivity of manufacturing processes for these resins, they have gained widespread acceptance in many fields, noticeably in fields where thermosetting resins have previously been used. However, since these resins are thermoplastic by nature, they cause troubles such as deformation by creep or insufficient heat resistance, and particularly, the reliability of these resins remains inferior to that of thermosetting resins.

The present inventors have made investigations in order to develop tough thermosetting resins having various properties comparable or superior to conventional diallyl phthalate resins and further possessing improved high impact strength.

These investigations have led to the discovery that diallyl terephthalate of formula (1) given above and the aromatic hydrocarbon of formula (2) above having at least one hydrogen atom at the benzyl position form a copolymer, and the resultant copolymer is a novel diallyl terephthalate copolymer not described in the prior literature and has improved flexural strength, markedly improved impact strength, and other improved properties while retaining the desirable properties of a diallyl terephthalate polymer.

Based on the quite new finding that the compound of formula (1) and the compound of formula (2) form a new polymeric compound having the aforesaid excellent properties, the inventors furthered their work and found that by reacting diallyl terephthalate of formula (1) with the aromatic hydrocarbon of formula (2) having at least one hydrogen atom at the benzyl position in the presence of an organic peroxide under specific controlled reaction conditions, they are copolymerized with a good reproducibility of the reaction to give the novel diallyl terephthalate copolymer of this invention having such a structure that (a) at the terminals of the monomeric unit of formula (1), one monomeric unit of formula (2) is bonded to the allyl groups of the monomeric unit (1) at their $$\overset{3}{C} \text{ and/or } \overset{3'}{C}$$

through a carbon-carbon bond at the benzyl position, and (b) the number of the monomeric units of formula (1) at the carbon-carbon bonded molecular chain segment formed of the allyl groups of the monomeric units of formula (1) in the copolymer is from 3 to 11, preferably from 3 to 10.

These specified reaction conditions could be selected for the first time after the inventors made the aforesaid new finding, and the selection of conditions for obtaining a copolymer has been completely unknown heretofore. It has also been found that the resulting diallyl terephthalate copolymer can be obtained as a so-called pre-polymer which can be further cured to an insoluble infusible three-dimensional polymer under selected conditions.

It has previously been known that a lower aliphatic alcohol or aromatic hydrocarbon can be used as a solvent in the polymerization of diallyl terephthalate (see, for example, Japanese Patent Publication No. 943/1960). It is also known that in an attempt to increase the polymerization conversion in the production of a prepolymer of diallyl phthalate, an aromatic hydrocarbon such as cumene or diisopropylbenzene is utilized as an additive (Japanese Patent Publication No. 1832/1973).

However, since the presence of the novel copolymer having the aforesaid improved properties and its moldability were completely unknown, these prior art documents do not disclose any information which is helpful for the formation of such a copolymer. As a matter of course, none of the prior literature including the aforesaid prior art describes the copolymerization reaction of diallyl terephthalate of formula (1) and the aromatic hydrocarbon of formula (2) and a copolymer of these.

The investigations of the present inventors have shown that by selecting specific controlled reaction conditions, among aromatic hydrocarbons previously recognized merely as a reaction solvent or a chain transfer agent, the specified aromatic hydrocarbon of formula (2) having at least one hydrogen atom at the benzyl position is introduced into the polymer chain as a copolymer component to be copolymerized with diallyl terephthalate of formula (1) to form a copolymer having the structural characteristics (a) and (b) described above, and this copolymer is a very useful novel copolymer having the excellent improved properties mentioned above.

It has also been found that this copolymer is useful for providing a resin composition having excellent utility in a wide range of fields by utilizing its excellent properties.

It is an object of this invention therefore to provide a novel diallyl terephthalate, a process for its production, and a resin composition containing it.

The above and other objects and advantages of this invention will become apparent from the following description.

The diallyl terephthalate copolymer of this invention is derived from diallyl terephthalate represented by the following formula (1)

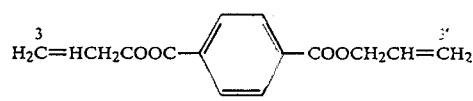

and an aromatic hydrocarbon having at least one hydrogen atom at the benzyl position and represented by the following formula (2)

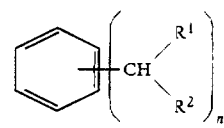

wherein each of $R^1$ and $R^2$ represents a member selected from the class consisting of a hydrogen atom and lower alkyl groups, and n is an integer of from 1 to 3; and has the characteristics (a) to (f) mentioned above.

According to a preferred embodiment of this invention, the copolymer of this invention additionally has at least one of the aforesaid characteristics (g) to (i).

The diallyl terephthalate copolymer of this invention has such a structure that at the terminals of the monomeric unit of formula (1), one monomeric unit of formula (2) is bonded to the allyl groups of the monomeric units of formula (1) at their $$\overset{3}{C} \text{ and/or } \overset{3'}{C}$$

through a carbon-carbon bond at the benzyl position [characteristic (a)]. Furthermore, the number of the monomeric units of formula (1) at the carbon-carbon bonded molecular chain segment formed of the allyl groups of the monomeric units of formula (1) in the copolymer is from 3 to 11, preferably from 3 to 10 [characteristic (b)].

This structure can be shown schematically below with respect to the case of using toluene ($R^1=R^2=H$, $n=1$) as the compound of formula (2).

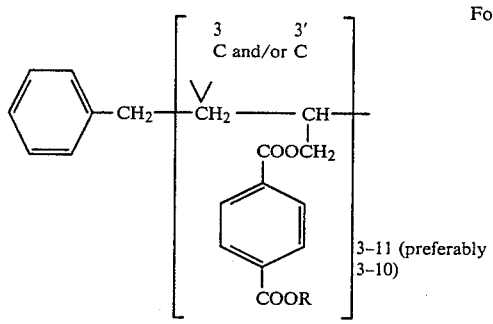

Formula (A)

In the structural portion of formula (A), R represents an unreacted allyl group $CH_2=CH-CH_2-$ and/or a chain of the following formula

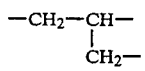

derived from an allyl group and constituting another molecular chain segment of the copolymer. As an example of this embodiment, a structural portion ($C_1$) represented by the following formula ($C_1$) may be cited.

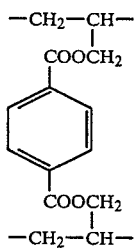

formula ($C_1$)

In the structural portion of formula (A), the number of the monomeric units of formula (1) in the carbon-carbon bonded molecular chain segment formed of the allyl groups of the monomeric units of formula (1) is 3 to 11, preferably 3 to 10, as stated above. This carbon-carbon bonded molecular chain segment [the structural portion of formula (B)] may have the followng head-to-head bonded portion [the structural portion of formula ($B_2$)]

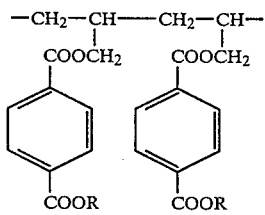

formula ($B_1$)

in addition to the head-to-tail bonded portion [the structural portion of formula ($B_1$)] shown in formula (A) above.

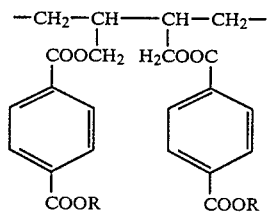

formula ($B_2$)

The monomeric unit of formula (1) in the above structural portion ($C_1$) constitutes a branching point for bonding two structural portions of formula (B) through two ester linkages. When R is an unreacted allyl group, the above embodiment can be represented by the following formula.

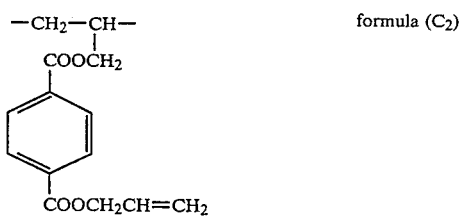

formula ($C_2$)

The structural portion of formula ($C_2$) becomes a curing site in the curing of the diallyl terephthalate copolymer of this invention. The double bond of the allyl group in the structural portion of formula ($C_2$) accounts for a major proportion (at least about 90%) of the degree of unsaturation represented by an iodine value measured by the Wijs method (characteristic (c) to be described hereinafter.

As stated above, the diallyl terephthalate copolymer of this invention has such a structural characteristic that (a) at the terminals of the monomeric units of formula (1), one monomeric unit of formula (2) is bonded to the allyl groups of the monomeric unit of formula (1) at their

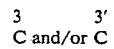

through a carbon-carbon bond at the benzyl position of the monomer of formula (2), and (b) the number of the monomeric units of formula (1) of the carbon-carbon bonded molecular chain segment [the structural portion of formula (B)] formed of the allyl groups of the monomeric units of formula (1) of the copolymer is from 3 to 11, preferably from 3 to 10.

The structural characteristics (a) and (b) of the copolymer of this invention contribute greatly in conjunction with the other characteristics (c) to (f) to the improvement of impact strength, flexural strength and moldability while retaining the excellent properties, such as dimensional stability, rigidity under heat, heat resistance and electrical properties, of the diallyl terephthalate copolymer.

The structural characteristics (a) and (b) of the copolymer of this invention are measured and determined as follows:

(1) A diallyl terephthalate copolymer sample was put in a vacuum dryer. The pressure was reduced at room temperature by means of an oil rotary vacuum pump and a diffusion pump, and the sample was dried until its weight became constant.

(2) The dried sample was dissolved in chloroform-d to a concentration of 10 to 20% by weight, and the proton NMR spectrum of the sample was measured at room temperature to 40° C. An NMR device at 60 to 300 MHz can be used. From the NMR spectrum, it was confirmed that the copolymer is composed of the monomeric units of formula (1) and the monomeric units of formula (2). At the same time, the ratio between the numbers of hydrogen atoms in the aromatic rings is determined, and the ratio of the monomeric units of formula (1) and the monomeric units of formula (2) in the copolymer is determined.

(3) One hundred parts by weight of the dried copolymer was heated under reflux for 24 hours together with ethanolic 1N potassium hydroxide (prepared by dissolving 135 parts of potassium hydroxide of special reagent grade in 2400 parts by volume of 99.5% ethanol) to hydrolyze and cleave the ester linkage portions of the copolymer. The reaction product was filtered, and the filtrate was acidified with hydrochloric acid and again filtered. The filtrate was concentrated under reduced pressure. While removing the precipitate formed during the concentration by filtration, volatile materials were removed over a water bath at 50° to 70° C. and 5 mmHg until the amount of the residue became constant. The resulting evaporation residue was the hydrolyzate.

(4) The hydrolyzate was dissolved in dimethyl sulfoxide-$d_6$ to a concentration of 5 to 10% by weight, and its proton and $^{13}C$ NMR spectra were measured.

The proton NMR was measured at 60 to 90 MHz and at room temperature to 100° C., and a structure in which the monomeric units of formula (2) were chemically bonded to polyallyl alcohol was determined. From the ratio of hydrogen atoms at the benzyl position of the side-chain alkyl group of the monomeric units of formula (2), to the number of hydrogen atoms at positions other than the benzyl position, it was determined that the only one hydrogen atom at the benzyl position reacted.

The $^{13}C$ NMR spectrum was measured at 90 MHz and 40° C., and a spectrum was obtained after 50,000 to 60,000 accumulations. When n is not 1 in the monomer of formula (2), the presence of a carbon atom at the benzyl position bonded to polyallyl alcohol through a carbon-carbon bond and a carbon atom at the benzyl position remaining unreacted was determined from the above spectrum. Furthermore, by checking this structure against the structure determined from the proton NMR, the structure of the hydrolyzate in which the monomer of formula (2) was bonded to one end of polyallyl alcohol at the benzyl position was determined.

When n is 1 in the monomer of formula (2), there is no carbon atom at the benzyl position which remains unreacted. Furthermore, since in the process of this invention, the carbon atoms on the aromatic nucleus do not participate in the copolymerization reaction in this invention [when n=0, namely when the monomer (2) is benzene, it is not copolymerized with the monomer of formula (1)], the monomer (2) is also bonded at one end of polyallyl alcohol.

(5) The mass spectrum of the hydrolyzate was measured. It was determined that m/e shows peaks at positions of [the molecular weight of the monomer of formula (2)−1]+58n (n=0, 2, 3, . . . ).

The above procedure permits determination of the structure of the copolymer in which one monomeric unit of formula (2) is bonded to the terminal of the carbon-carbon bonded molecular chain segment formed of the allyl groups of the monomeric unit of formula (1) for each such segment.

(6) The molecular weight of the hydrolyzate was measured by a vapor pressure permeation method.
Instrument used: Molecular weight measuring device (Model 115 or 114, made by Hitachi-Perkin Elmer)
Solvent: methanol
Temperature: 40° C.

Four or five dilute solutions of the hydrolyzate having a concentration of $1 \times 10^1$ to $5 \times 10^1$% by weight were prepared, and ΔR was determined by the measuring device. The apparent molecular weight was determined from a calibration curve (prepared by using benzil). The concentration was plotted on the abscissa, and the apparent molecular weight, on the ordinate. A curve connecting the plotted apparent molecular weights was extrapolated to C→O, and the number average molecular weight $\overline{M}n$ of the hydrolyzate was determined. From the determined molecular weight, [the molecular weight of the monomer of formula (2)-1] was substracted, and the result was divided by the molecular weight (58) of allyl alcohol. Thus, the number of the monomeric units of formula (1) at the carbon-carbon bonded molecular chain portion formed of the allyl groups of the monomeric units of formula (1) in the copolymer was calculated.

The diallyl terephthalate copolymer of this invention is characterized by having a degree of unsaturation, expressed as an iodine value measured by the Wijs method, of from 40 to 85, preferably from 45 to 80 [characteristic (c)].

The iodine value was derived mainly from the double bond of the allyl group in the structural portion of formula ($C_2$) in the copolymer of this invention. Usually, at least about 90% of the degree of unsaturation is ascribable to this double bond, and the remainder will be ascribed to a double bond which may be present on that portion (to be described hereinafter) of the structural portion of formula (B) in the structure of formula (A) which is opposite to the monomeric unit of formula (2). The structural portion of formula ($C_2$) constitutes a curing site in curing the diallyl terephthalate copolymer of this invention. The number of the structural portions of formula ($C_2$) is about 6 to about 137 per molecule of the copolymer. Accordingly, the proportion of the monomeric units of formula (1) constituting the structural portion (B) in which R is the group $CH_2=CH-CH_2-$, i.e. the structural portion ($C_2$) is about 43 to about 83%. The remainder takes the form of the structural portion ($C_1$) in which R is

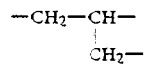

This structural portion appears to be a curing site or branching point of unit chains.

The degree of unsaturation expressed by the iodine value in characteristic (c) of 40 to 85, preferably 45 to 80, is generally lower than that (80 to 95) of practical diallyl terephthalate polymers obtained by conventional methods. The characteristic (c) thus relates closely to the achievement of the improved flexural strength and the markedly improved impact strength of the copolymer of this invention together with the structural characteristics (a) and (b), and also contributes to it in combination with the other characteristics (d), (e) and (f) while these characteristics are affecting each other.

If, in relation to the structural characteristics (a) and (b), the iodine value is less than 40, various inconveniences such as the undue retardation of the rate of curing, the decrease of the mechanical strength, the decrease of impact strength and reduced heat resistance arise. If the iodine value exceeds 85, there occur defects such as the decrease of impact strength, the formation of a gel during the preparation of a compound, the deterioration of the other processing characteristics, the formation of strains during curing.

The iodine value in characteristic (c) is measured and determined by the Wijs method as follows:

(c) Method of measuring and determining the iodine value

The copolymer was precisely weighed in the range of 0.25 to 0.35 g, and put in a 200 ml Erlenmeyer flask equipped with a ground stopper. About 30 ml of chloroform was added to dissolve the sample completely. Twenty ml of the Wijs reagent (obtained by a dissolving 7.9 g of iodine trichloride and 8.2 g of iodine respectively in 200 to 300 ml of glacial acetic acid, mixing the solutions, and adjusting the amount of the mixed solution to 1 liter) was accurately added by means of a whole pipette. Then, 10 ml of a 25% glacial acetic acid solution of mercuric acetate, was added and the mixture was left to stand in a dark place for 20 minutes to complete the reaction.

Five milliliters of a freshly prepared 20% aqueous KI solution was added, and the mixture was titrated with a 0.1N—$Na_2S_2O_3$ standard solution using a 1% aqueous starch solution as an indicator. At the time of titration, the flask was vigorously shaken. A blank test was also carried out.

$$\text{Iodine value} = \frac{(A - B) \times f \times 1.27}{s}$$

A: the amount in milliliters of the 0.1N—$Na_2S_2O_3$ required in the blank test
B: the amount in milliliters of the 0.1N—$Na_2S_2O_3$ solution required in the main test
f: the titer of the 0.1N—$Na_2S_2O_3$ solution
s: the amount in grams of the sample.

The diallyl terephthalate copolymer of this invention is characterized by having a true specific gravity at 30° C. of from 1.20 to 1.25, preferably from 1.21 to 1.25 [characteristic (d)].

This true specific gravity is generally lower than the true specific gravity (about 1.24 to 1.27) of conventional diallyl terephthalate polymers. This characteristic (d) has to do with the structural characteristics (a) and (b), and in combination with the other characteristics (c), (e) and (f), it contributes to the increase of impact strength and light weight and also affects the maintaining of good mechanical strength and heat resistance while these characteristics are affecting each other.

If the true specific gravity (d) is less than 1.20, a reduction occurs in impact strength, mechanical strength and heat resistance. If it exceeds 1.25, a deterioration in impact strength also occurs.

The true specific gravity of the diallyl terephthalate copolymer of this invention is measured and determined by the following method.

(d) Method of measuring and determining the true specific gravity

About 7 g of the copolymer was molded by a mold into a disc-like tablet having a diameter of 30 mm and a thickness of about 10 mm. For air releasing, an operation of pressurizing it under about 570 kg/cm² and then releasing the pressure was repeated 4 to 5 times. Then, it was pressed under about 1400 kg/cm². The resulting tablet was held by polyethylene terephthalate films each having a thickness of about 50 microns. It was pre-heated by a high-frequency pre-heater to a point near the softening temperature of the copolymer, and pressed for about 30 seconds under a pressure of about 1400 kg/cm² to form a plate. The pressing temperature was set at a point 10° to 20° C. higher than the upper limit of the softening temperature range of the copolymer. The plate was taken out from the press and allowed to cool. By visual inspection, that part which was free from air bubbles was selected, and bent and broken to form a square test piece each side measuring about 20 mm.

The measurement was carried out in a constant temperature chamber kept at 25° C.±0.5° C. The test piece and deionized water for use in measurement had been moisture-controlled by allowing them to stand for a day and night in a constant temperature chamber. A jig such as a clip for suspending the test piece from a balance was also provided.

The weight (a g) of the test piece was measured. Then, the weight (c g) of the jig in water was measured. Furthermore, the test piece was secured to the jig, and the total weight (b g) of the test piece and the jig in water was measured. The specific gravity of the test piece was calculated from the following equation.

$$\text{Specific gravity of the test piece} = a/(a - b + c)$$

The average value of the specific gravities of three test pieces was defined as the true specific gravity of the copolymer at 25° C.

The diallyl terephthalate copolymer of this invention has a number average molecular weight ($\overline{M}n$) of 4,000 to 10,000 and a weight average molecular weight ($\overline{M}w$) of 70,000 to 200,000 as measured by gel permeation chromatography (GPC) and calculated for polystyrene [characteristic (e)].

Thus, the $\overline{M}n$ of the copolymer of this invention is generally lower than the $\overline{M}n$ (about 6,000 to 20,000) of conventional diallyl terephthalate polymers, and the $\overline{M}w$ of the copolymer of this invention is generally higher than the $\overline{M}w$ (about 60,000 to about 130,000) of conventional diallyl terephthalate polymers. The characteristic (e) has to do with the structural characteristics (a) and (b), and in combination with the other characteristics (c), (d) and (f), contributes to the improvement of impact strength, other mechanical characteristics, processability and moldability and the maintenance of good heat resistance while these characteristics are affecting each other.

If the $\overline{M}n$ and $\overline{M}w$ of the copolymer are too low, there arises inconveniences such as the decrease of the viscosity of the copolymer, the decrease of its softening temperature, the decrease of the hardness of a cured product therefrom and the deterioration of its mechanical strength. If they are too high, its impact strength, processability or moldability will be deteriorated.

The $\overline{M}n$ and $\overline{M}w$ of the diallyl terephthalate copolymer of this invention are measured and determined as follows:

(e) Method of measuring and determining $\overline{M}n$ and $\overline{M}w$

These were measured and determined by gel permeation chromatography. 150C GPC manufactured by Waters, Co. was used. Data processing was performed by a data module manufactured by the same company, and $\overline{M}n$ and $\overline{M}w$ were calculated. Two $10^2$ Å Waters micro column series and one each of $5 \times 10^2$ Å, $10^3$ Å, $10^4$ Å and $10^5$ Å were connected in series in this order. Tetrahydrofuran was used as a solvent, and the measurement was performed at a temperature of 25° C. at a flow rate of 2.0 ml/min.

(1) First, a calibration curve was prepared. Six kinds of commercially available standard polystyrene samples having known number average molecular weights (number average molecular weights 350000, 217000, 92600, 9100, 3570, 1790) and diallyl terephthalate monomer (molecular weight 246) were each subjected to measurement of the retention time. The data obtained were input into the data moldule, and a calibration curve approximating the relation between the number average molecular weight and the retention time by a cubic curve was obtained.

(2) From a solution of 20 mg of the copolymer sample in 20 ml of tetrahydrofurane, about 2 ml of the solution was taken into a sample bottle and measured by using an autosampling device. The data were automatically processed in the data module on the basis of the calibration curve prepared as above, and the $\overline{M}n$ and $\overline{M}w$ were calculated. The peaks were divided at intervals of 15 seconds. Let the molecular weight at each divided point be Mi and the height of the peak be Hi, then the $\overline{M}n$ and $\overline{M}w$ are calculated in accordance with the following equations.

$$\overline{M}n = \frac{\Sigma Hi}{\Sigma(Hi/Mi)} \quad \overline{M}w = \frac{\Sigma MiHi}{\Sigma Hi}$$

The diallyl terephthalate copolymer of this invention has a molecular weight distribution, expressed by the $\overline{M}w/\overline{M}n$ ratio, of from 10 to 40 [characteristic (f)].

This molecular weight distribution of the copolymer of this invention is generally larger than that (about 5 to 10) of conventional diallyl terephthalate polymers. The characteristic (f) has to do with the structural characteristics (a) and (b), and in combination with the other characteristics (c), (d) and (e), contributes to the improvement of impact strength, and the provision of good flexural modulus and a moderate rate of curing.

If the $\overline{M}w/\overline{M}n$ ratio is less than 10, the impact strength is reduced and the flowability of the molten copolymer during molding becomes poor. If it exceeds 40, the rate of curing is unduly retarded.

The diallyl terephthalate copolymer of this invention has the aforesaid characteristics (a) to (f) and differs from conventional diallyl terephthalate polymers. Preferably, it has at least one of additional characteristics (g) to (i) described below.

The diallyl terephthalate copolymer of this invention preferably has a softening temperature range of from about 50° C. to about 120° C., preferably from about 60° to about 110° C., and more preferably from about 70° to about 100° C. [characteristic (g)].

This softening temperature range is shifted to a higher temperature side as compared with conventional diallyl terephthalate polymers which have a softening temperature range of up to about 100° C. This characteristic (g), in combination with the aforesaid characteristics (a) to (f), contributes to the excellent processability and moldability of the copolymer of this invention and serves to avoid occurrence of strains during curing. If the softening temperature is lower than the specified limit, the moldability of the copolymer is deteriorated, and the curing rate becomes unduly retarded. If it is higher than the specified limit, the processability of the copolymer becomes inferior, and its moldability is also aggravated to cause increased molding strains.

The softening temperature of the copolymer of this invention is measured and determined by the following method.

(g) Measurement and determination of the softening temperature

A light-transmitting automatic melting point measuring device (Model PF61 manufactured by Mettler Instrumente AG) was used.

(1) The copolymer sample was fully pulverized in an agate mortar, and filled in the attached capillary tube to a height of about 4 mm with a care taken not to allow spaces. The capillary tube was set in the aforesaid device, and the temperature was raised from about 40° C. at a rate of 0.2° C./min. The light transmittance of the set sample was measured. The results of the measurement were recorded on a recording paper to obtain a measurement curve in the attached drawing which shows the relation between the temperature and the light transmittance. In the drawing, the abcissa represents the temperature, and the ordinate, the light transmittance.

(2) The straight line XA before melting was extended, and the straight line YF during melting was extended. The straight line portion CD of the curve AF during melting was extended to both sides, and the intersecting points B and E with the previously drawn two straight lines were determined. A straight line passing through B was drawn so that it bisects the area of the resultant triangle ABC. Thus, the intersecting point B' with the measurement curve was determined. Likewise, the intersecting point E' was determined. The temperatures of B' and E' were read from the abscissa, and the temperature between B' and E' is defined as the softening temperature range of the sample.

Preferably, the diallyl terephthalate copolymer of this invention has a viscosity, determined for its 50% methyl ethyl ketone solution at 30° C., of from 80° to 300 centipoises [characteristic (h)].

This preferred characteristic, in combination with the preferred Brabender melt viscosity characteristic (i) to be described below as well as the other characteristics of the copolymer of this invention which have been described above, serves to improve the processability and moldability of the copolymer of this invention and also to provide a moderate rate of curing and prevent occurrence of curing strains.

Preferably, the diallyl terephthalate copolymer of this invention has a Brabender melt viscosity, measured by Brabender plastography, of 250 to 2,600 m.g., preferably 400 to 2,500 m.g, and a processing time of 5 to 65 minutes, preferably 10 to 60 minutes.

In the present invention, the viscosity, Brabender melt viscosity and processing time were measured and determined as follows:

(h) Measurement and determination of viscosity 15 to 25 g of the copolymer sample was precisely weighed in a 100 ml Erlenmeyer flask, and the same weight of methyl ethyl ketone was added to form a 50% by weight solution. The solution was transferred to an Ubbelohde's viscometer, and put in a constant temperature water vessel which had been kept at 30° C. On standing for 15 minutes, the flowing time t was measured by a stop watch to a unit of one-tenth of a second. The measurement was repeated three times and the average value was calculated. Furthermore, by using a suitable standard solution for calibrating a commercial viscometer, the coefficient of the Ubbelohde's viscometer was determined. On the other hand, by using a Gay-Lussac type pycnometer, the specific gravity $d_4^{30}$ of the sample solution was measured. The viscosity $\eta$ sought was calculated in accordance with the following equation.

$$\eta = t \times f \times d_4^{30}$$

(i) Measurement and determination of Brabender melt viscosity and processing time These are measured by a Brabender plastograph of Brabender Company (German). The device had a 50 cc capacity kneading chamber, and a rotor of type W50H. Zinc stearate (0.5 g) was added to 50 g of the copolymer sample, and they were well mixed and uniformly dispersed. The resulting mixture was used as a material to be measured. The measurement was made while maintaining the temperature of the kneading chamber at 130° C. and the rotating speed of the rotor at 22 rpm. Changes in kneading resistance with respect to the kneading time were recorded on a recording paper as a torque curve in m.g unit. The measurement was continued until the kneading resistance reached 5000 m.g. From the torque curve of the recording paper, the minimum value of the torque was read and defined as the Brabender melt viscosity. On the other hand, the time which elapsed from the end of feeding the sample until the kneading resistance reached 5000 m.g was read from the recording paper, and defined as the processing time.

The structural characteristics of the diallyl terephthalate copolymer of this invention have been described in detail hereinabove with regard to the characteristics (a), (b) and (c). That portion of the structural portion (B) in the structure of formula (A) shown above with regard to the case of using toluene as the compound of formula (2) which is opposite to the monomeric unit of formula (2) has to do with a polymerization stopping reaction or a destructive chain-transfer reaction, and can take various structures. Investigations of the present inventors show that some structures such as those exemplified below are present as a mixture in the aforesaid portion.

One type is a structure which results from coupling of terminal radicals at the structural portion of formula (B), i.e. the structural portion ($B_1$) and/or ($B_2$), in the structure of formula (A). For example, it includes the following case.

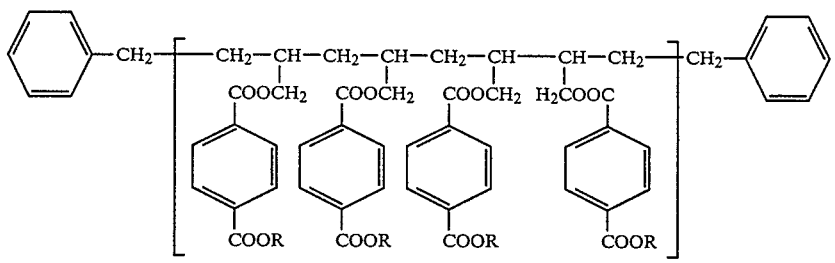

Another type is a structure resulting from a reaction of hydrogen extraction by the radical at the terminal of the structural portion of formula (B) from another portion. For example, it includes the following case.

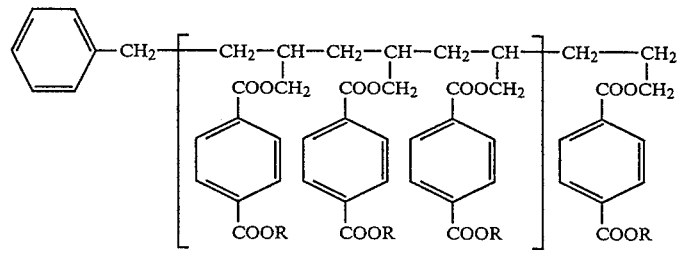

As another type, there is a structure in which an unsaturated bond owing to a disproportionation reaction between the terminal radicals of the structural portion of formula (B) is formed. For example, this includes the following case.

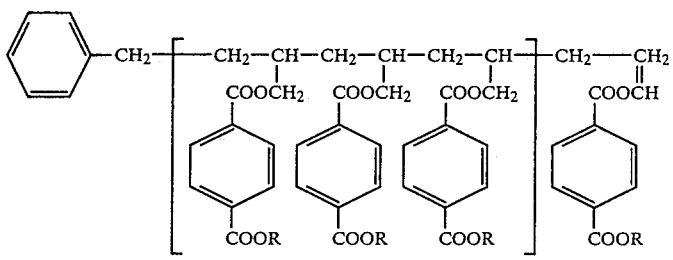

There can be present other kinds of terminal structures such as a terminal structure resulting from the reaction between a radical at the terminal of the structural portion of formula (B) and a radical formed at one benzyl position of the monomer (2), and a terminal structure resulting from the reaction of allyl radicals which are formed by the extraction of the hydrogen atom at the allyl position of the diallyl terephthalate monomer or a partial structure of the polymer, etc.

The diallyl terephthalate copolymer of this invention can be produced by selecting specific controlled reaction conditions, and copolymerizing diallyl terephthalate of the following formula (1)

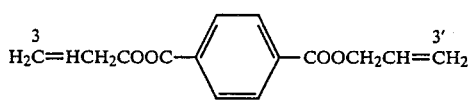

with an aromatic hydrocarbon having at least one hydrogen atom at the benzyl position and represented by the following formula (2)

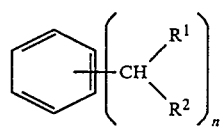

wherein each of $R^1$ and $R^2$ represents a member selected from a hydrogen atom and lower alkyl groups, and n is an integer of 1 to 3.

Since as stated hereinabove in detail, the presence of the copolymer described above, its characteristics and means for identifying it have been elucidated by the present invention, those skilled in the art can easily establish other embodiments experimentally using the above guidelines and employ other manufacturing means. It should be understood therefore that the diallyl terephthalate copolymer of this invention is in no way limited by the manufacturing embodiment illustrated below.

The diallyl terephthalate copolymer of this invention can be produced for example, by reacting the compound of formula (1) and the compound of formula (2) in the presence of a known organic peroxide or an azo compound catalyst under cage effect conditions, as will be described in detail with regard to an embodiment in which xylene is used as the compound of formula (2). The production of the copolymer of this invention will be described below in detail with regard to an embodiment in which diallyl terephthalate (DAT) and xylene are polymerized in the presence of di-tert-butyl peroxide (DTBPO) as a catalyst.

Xylene is charged into a polymerization vessel, and diallyl terephthalate (DAT), di-tert-butyl peroxide (DTBPO) and xylene, maintained in a mole ratio of 2.0–8.4:0.5:1, are simultaneously fed continuously into the polymerization vessel from a nozzle provided at one point within the polymerization zone, and subjected to a polymerization operation with strong stirring. The suitable amount of xylene to be charged in advance into the polymerization vessel may be at least 5 times the weight of DAT used in the polymerization reaction. Conveniently, xylene and DTBPO are mixed at the above ratio before they are fed into the polymerization vessel. Preferably, this mixture is cooled to less than about 5° C. in advance in order to prevent DTBPO from heat decomposing to form tert-butoxy radicals and the resulting radicals from extracting hydrogen from the methyl group of xylene to form methyl benzyl radicals, and also the resulting methyl benzyl radicals from coupling.

The above nozzle is conveniently composed of two pipes so that a mixture of xylene and DTBPO is fed from the inside pipe and DAT cooled at less than about 15° C. is fed from the outside pipe provided to surround the circumferential portion of the inside pipe. Good results are obtained by making the length of the inside pipe shorter than the outside pipe so that the three components are mixed immediately before they are fed into the liquid phase. Desirably, the outlet of the nozzle is provided always in the liquid phase in order to prevent DAT or DTBPO fed from the nozzle from escaping into the space of the polymerization vessel and thus disturbing the aforesaid ratio of the reaction components. Stirring is preferably carried out by using turbine vanes or other means having a high stirring efficiency. Preferably, the stirring is carried out strongly so that the peripheral speed becomes at least about 20 m/sec. In this example, the polymerization temperature is preferably about 140° to 170° C. Since the boiling point of DTBPO at atmospheric pressure is 109° C., the reactor is made in a closed structure in order to keep the components well in the liquid phase and maintain the above ratio. Hence, a high-pressure pump is used to feed the mixture of DAT, xylene and DTBPO.

When according to the aforesaid embodiment, components having different temperatures, viscosities and compositions are fed into a liquid phase at high temperatures and rapidly dispersed, it is possible to disperse numerous minute "cages" of the three components, DAT, DTBPO and xylene, in the liquid phase and to realize "cage" effect conditions. If these components are fed from a nozzle located at a sufficiently remote position, the individual components are merely dispersed in the liquid phase, and the desired cage effect conditions are difficult to achieve. The same can be said when predetermined amounts of the components are charged at a time at the outset.

By performing the reaction under conditions of the effect of cages composed of DAT and xylene as stated above, 0.5 mole of DTBPO heat-decompose to form 1 mole of t-butoxy radicals. In order to be able to control the addition of the radicals to DAT, it is preferable to use the radicals as diluted with xylene from the outset, and to cool DAT in advance to about 15° C. thereby reducing its activity. Thus, by the reaction under the cage effect conditions, the aforesaid radicals quantitatively extract hydrogen from xylene in the cages to form 1 mole of methylbenzyl radicals. Since these radicals have a great ability to add to DAT, they add to the carbon atoms of the allyl group of DAT, and polymerization begins.

As described above, according to the above production example, the polymerization can be started by the attacking of the DAT monomer by the methylbenzyl radicals in the cages.

On the other hand, since the inside of the polymerization vessel is strongly stirred, the molecules in the cages rapidly disperse and dissolve uniformly in the system, and by the sufficient diluting effect by a large amount of xylene charged in advance into the polymerization vessel, the rate of the growing reaction of the allyl polymerization of the DAT monomer becomes very slow, and the rate of the stopping reaction becomes relatively large, and polymer molecules are formed in number corresponding to the number of radicals generated by the addition of the methylbenzyl radicals with a structure wherein at their benzyl position, they are bonded to the allyl groups of the DAT monomer at $$\overset{3}{C} \text{ and/or } \overset{3'}{C}$$

through a carbon-carbon bond. Hence, the size of a unit chain cannot be more than the mole ratio of the DAT monomer and DTBPO fed. Presumably, therefore, the reaction can be controlled so as to form a molecular chain in which the number of DAT monomer units in a unit chain, i.e. a carbon-carbon bonded molecular chain segment formed of one xylene molecule and the allyl groups of the DAT monomer unit is from 3 to 11.

To obtain the desired copolymer having the desired composition and structure depending upon the ratio of the individual components fed, the temperature in this embodiment is preferably about 140° to about 170° C. to carry out the reaction of extracting hydrogen from xylene quantitatively before the "cages" are broken. In order to prevent t-butoxy radicals generated from DTBPO from going out of the "cages" and reducing the efficiency of starting the polymerization, and what is more important, to prevent them from disturbing the ratio of xylene and DAT in the copolymer, the nozzle is conveniently provided at one point as stated above.

With the progress of the polymerization reaction, the reaction of unit chains with each other, and the reaction of a growing unit chain with a unit chain which has already grown take place. As the polymerization reaction further advances, a copolymer composed of giant molecules resulting from the reaction of some unit chains also participates in the reaction. In these stages, the unreacted allyl groups of the DAT monomer unit in the polymer participate in the reaction. In other words, the polymer becomes bigger as a result of two unit chains having at least one DAT monomer in common.

Accordingly, depending upon what part of the unit chain reacts, it is determined whether the structure of the copolymer as a whole stretches like a ladder, or is curled with many branchings.

Another very important point for forming the copolymer of this invention is as follows:-In order to form a diallyl terephthalate copolymer of a stretched structure, the reaction should be controlled such that allyl radicals adding to the allyl groups of the DAT monomer, not the allyl groups bonded to the already formed polymer, form, and bulky radicals formed from one xylene molecule and one DAT monomer (may be two or more monomers) can act as a site of starting substantial growth.

As is well known, one method of improving impact strength will be to perform curing at a suitable curing density while inducing sufficient entanglement in the molecular chains which stretch in the form of straight line. It is known that such a so-called polymer effect generally begins to appear with a molecular weight of about 5000.

It is essential for the improvement of impact strength to form a polymer basically having a stretched structure instead of a random coil-like structure. According to the method of the aforesaid embodiment, the reaction can be controlled so that methylbenzyl radicals which easily add to allyl radicals are formed and first added to the DAT monomer to form bulky radicals. Thus, the reaction can be controlled so that at the time of growing the molecular chains, the reaction of the allyl groups at the terminals of the molecular chain rather than at its inside which is subject to steric hindrance is carried out preferentially. Presumably for this reason, a copolymer having a structure stretching in the form of a ladder can be produced.

Furthermore, according to the aforesaid embodiment of a production, the mole ratio between DAT and DTBPO is maintained constant in the entire system, and the lengths of unit chains which are carbon-carbon bonded molecular chain segments formed of one xylene molecule and the allyl groups of the DAT monomer unit can be controlled nearly to a definite value. The growth to the copolymer according to this invention can be achieved through steps including the reaction of unit chains with each other. However, if the reaction is induced in all of the positions in the molecular chains without control, the polymer tends to assume a random coil-like structure rather than a stretched structure. Furthermore, loop-like sites between molecular chains tend to form, and this promotes gellation.

Predetermined amounts of DAT, DTBPO and xylene are fed at predetermined rates of feeding, and after the copolymerization is over, the copolymer is separated by using, for example, an aliphatic hydrocarbon or an alcohol and dried. As a result, the diallyl terephthalate copolymer of this invention can be obtained which is a thermosetting resin and has very high impact strength.

Examples of the aliphatic hydrocarbons which can be used for this purpose include hexane and heptane, and examples of the alcohols are methanol, ethanol, isopropanol and tert-butanol.

One example of producing the diallyl terephthalate of this invention has been described in detail together with guidelines for selecting the specific controlled reaction conditions. Since the diallyl terephthalate copolymer of this invention, its structural characteristics and means for identifying it have been elucidated by the present invention, those skilled in the art can easily establish experimentally other modified embodiments of its production by considering the aforesaid guidelines.

Each of groups $R^1$ and $R^2$ of the aromatic hydrocarbon of formula (2) to be used in forming the diallyl terephthalate copolymer of this invention is selected from the class consisting of a hydrogen atom and lower alkyl groups. Examples of the lower alkyl groups are $C_1$–$C_3$ alkyl groups. Examples of the compound of formula (2) include toluene, ethylbenzene, n-propylbenzene, isopropylbenzene, n-butylbenzene, isobutylbenzene, sec-butylbenzene, n-amylbenzene, sec-amylbenzene, isoamylbenzene, (2-methylbutyl)-benzene, o-xylene, m-xylene, p-xylene, xylene isomeric mixture, pseudocumene, 1,2-diethylbenzene, 1,3-diethylbenzene, 1,4-diethylbenzene, 1,2-dipropylbenzene, 1,3-dipropylbenzene, 1,4-dipropylbenzene, diisopropylbenzenes, p-cymene, 1,2-dibutylbenzene, 1,3-dibutylbenzene, 1,4-dibutylbenzene, 1,2-diisoamylbenzene, 1,3-diisoamylbenzene, 1,4-diisoamylbenzene, and 1,2,3-trimethylbenzene.

Examples of the organic peroxide and azo compound used as a catalyst in forming the diallyl terephthalate copolymer of this invention include dialkyl peroxides such as di-tert-butyl peroxide, disec-butyl peroxide, tert-butyl-sec-butyl peroxide, and dicumyl peroxide; diaryl peroxides; diacyloyl or diacyl peroxides such as benoyl peroxide; alkyl esters of percarboxylic acids such as di-tert-butyl peroxalate and tert-butyl perbenzoate; azo compounds such as 2,2'-azobisisobutyronitrile, 2,2'-azobis-(2-methylbutyronitrile), 2,2'-azobis-(2-methylheptanitrile), 1,1'-azobis-(1-cyclohexylcarbonitrile), methyl 2,2'-azobisisobutyrate, 4,4'-azobis-(4-cyanopentanoic acid), and azidobenzene; and hydroperoxides such as tert-butyl hydroperoxide, sec-butyl hydroperoxide, tetralin hydroperoxide, cumyl hydroperoxide, benzylhydroperoxide, benzhydryl hydroperoxide, decalin hydroperoxide, acetyl peroxide, cyclohexyl hydroperoxide, and n-decyl hydroperoxide. Furthermore, compounds which are susceptible to oxidation with molecular oxygen may also be used. For example, the diallyl terephthalate, the aromatic hydrocarbon of formula (2) having at least one hydrogen atom at the benzyl position, and the copolymer of this invention correspond to such oxidizable compounds. If they undergo oxidation with air or oxygen in advance or during the copolymerization reaction to form a peroxide, they can also be used as a catalyst for the copolymerization reaction in accordance with this invention.

As stated hereinabove, the lack of toughness has often been pointed out as a defect of conventional diallyl terephthalate resins. Thus, in practical applications, complaints have been raised against this defect of the diallyl terephthalate resins. For example, molded articles therefrom tend to be chipped when they are dropped during handling. Protruding portions such as a rib are prone to be broken. When an article of the diallyl terephthalate resin is used as a connector for an electronic circuit, that part which comes into contact with a printed circuit board tends to be broken. Or it is susceptible to cracking at the time of thread tapping. In recent years, with the reduction in size of electronic instruments and parts, the distance between a connector and a pin, for example, is required to be narrowed. Furthermore, a wiring method by pressure bonding as well as soldering requiring heat stability has gained widespread acceptance, and this permits the use of thermoplastic resins in this field. However, because of the requirements for dimensionable stability, heat resistance and creep resistance, thermosetting resins are used in this field in many cases. Hence, it has been strongly desired to improve the toughness and impact strength of diallyl phthalate resins.

Heretofore, impact strength has been evaluated by Charpy or Izod impact values. These values can be a measure of impact strength when the samples have a large thickness. But the situation is frequently different in the case of thin-walled samples. In view of the trend for the reduction of the size of the component parts, the present inventors have decided to use mainly a falling weight test using a thin plate. When this testing method is used under the same conditions, the diallyl terephthalate copolymer of this invention has a falling weight impact value of at least about 80 mm, and even reaches 189 mm as shown in Example 17, whereas conventional diallyl terephthalate resins have a falling weight impact value of about 20 to 30 mm. Thus, the copolymer of this invention shows impact strength which is unexpected and markedly improved. Furthermore, while conventional diallyl terephthalate polymers have a flexural strength of about 4.0 to 6.3 kg/mm$^2$, the diallyl terephthalate copolymer of this invention has a flexural strength of at least about 6 kg/mm$^2$, and even reaches 7.4 kg/mm$^2$ as shown in Example 21 given hereinafter.

The diallyl terephthalate copolymer of this invention thus shows exceptionally good impact strength and improved flexural strength. Furthermore, it has reduced molding shrinkage, and is excellent in heat resistance, creep resistance, dimensional stability, chemical resistance, mechanical strength and electrical insulation. Furthermore, it has excellent insulating properties under severe conditions of high temperatures and high humidities over a long period of time, and retains resistance and dimensional stability to deformations at high temperature and under loads. Thus, the diallyl terephthalate copolymer of this invention retains, or outweighs, all of the properties of conventional diallyl phthalate resins, and additionally has surprising toughness described above.

By blending the dially terephthalate copolymer of this invention with additives such as fillers, curing agents, curing accelerators, inhibitors, internal mold releasing agents, coupling agents, pigments and other additives in amount which do not impair the properties of the copolymer, its moldability or the properties of molded articles therefrom can be improved.

Thus, according to this invention, there can be provided a diallyl terephthalate copolymer composition composed of the diallyl terephthalate copolymer of this invention and a curing amount of a curing agent, and if desired, the additives to be described in detail hereinbelow.

The amount of the curing agent is, for example, about 0.005 to about 6% by weight based on the weight of the copolymer.

The additives in the diallyl terephthalate copolymer composition of this invention will be specifically described below.

As the fillers, inorganic and/or organic fillers can be used. They may be used either singly or in combination. The amount of the fillers used is, for example, about 1 to about 300% by weight based on the weight of the copolymer.

Specific examples of the inorganic fillers include talc, mica, asbestos, glass powder, silca, clay, hollow microspheres, titanium oxide, magnesium oxide, calcium carbonate, alumina, asbestos fibers, silica fibers, glass fibers, silica glass fibers, alumina fibers, carbon fibers, boron fibers, beryllium fibers, steel fibers, and whiskers. Examples of the organic fillers include natural fibers such as cellulose fibers, pulp, acrylic fibers, polyester fibers such as polyethylene terephthalate fibers, cotton, rayon, polyvinyl alcohol fibers, polyamide fibers, polyimide fibers, polyimideamide fibers, polybismaleimide fibers and bismalimide triazine fibers. These fibers may be in the form of a woven fabric, a knitted fabric, a nonwoven fabric, a mat, etc.

Examples of the curing agents or curing accelerators include metallic soaps such as cobalt, vanadium and manganese salts of naphthenic acid or octanoic acid, aromatic tertiary amines such as dimethylaniline and diethylaniline, and organic peroxides and azo compounds to be described below. The amount of the curing agents or curing accelerators may, for example, be about 0.005 to about 6% by weight based on the weight of the diallyl terephthalate copolymer of this invention.

Examples of the inhibitors include quinones such as p-benzoquinone and naphthoquinone, polyhydric phenols such as hydroquinone, p-tert-butyl catechol, hydroquinone monomethyl ether and p-cresol, and quaternary ammonium salts such as tetramethyl ammonium chloride. The amount of the inhibitors may, for example, be about 0.001 to about 0.1% by weight, based on the weight of the copolymer of this invention.

Examples of the internal mold releasing agent are metal salts of stearic acid such as calcium stearate, zinc stearate and magnesium stearate. The amount of the internal mold releasing agent may, for example, be about 0.1 to about 5% by weight based on the weight of the copolymer of this invention.

Examples of the coupling agents include gamma-methacryloxypropyl-trimethoxysilane, vinyltriethoxysilane and allyltrimethoxysilane. The amount of the coupling agent may, for example, be about 0.01 to about 3% by weight based on the weight of the copolymer of this invention.

Examples of the pigments include carbon black, iron black, cadmium yellow, benzidine yellow, cadmium orange, red iron oxide, cadmium red, cobalt blue and anthraquinone blue. The amount of the pigments used may, for example, be about 0.01 to about 10% by weight based on the weight of the copolymer of this invention.

As other additives, thermoplastic resins in the form of a latex and/or a powder and/or a mass may be cited. Examples include polyvinyl alcohol, polyvinyl acetals, ABS, polyethylene, polystyrene, polypropylene, polyvinyl chloride, polybutadiene, chlorinated polyethylene, ethylene/α-olefin copolymers and ethylene/vinyl acetate copolymer. The amount of the thermoplastic resin may, for example, be about 2 to about 38% by weight, preferably about 3 to about 34% by weight, based on the weight of the copolymer of this invention.

Rubbers, blowing agents, blowing aids, and magnetic materials may also be cited as the additives used in the composition of this invention.

Examples of the rubbers are natural rubbers, isoprene rubber, chloroprene rubber, neoprene rubber, nitrile rubber, butadiene rubber, butadieneacrylonitrile rubber, butadiene-styrene rubber, urethane rubber, epichlorohydrin rubber, and rubbery chlorinated polyethylene which are in the form of a latex and/or a mass.

Examples of the blowing agents are dinitroisopentamethylene tetramine, azodicarbonamide, toluenesulfonyl hydrazide, azobisisobutyronitrile and 4,4'-hydroxybis(benzenesulfonyl hydrazide).

Examples of the blowing aids are urea and lead oxide.

Examples of the magnetic materials are Sendust, molybdenum Permalloy, carbonyl iron, ferrite and rare earth magnetic materials.

The amount of the rubbers may, for example, be about 2 to about 34% by weight, preferably about 3 to about 29% by weight, based on the weight of the copolymer of this invention.

The amount of the blowing agent or the blowing aid may for example, be about 1 to about 17% by weight, based on the weight of the copolymer of this invention.

The amount of the magnetic material is about 1 to about 900% by weight, based on the weight of the copolymer of this invention.

Abrasives and abrasive aids may also be used. They include artificial abrasives such as silicon carbide, sintered alumina, cubic system boron nitride, alumina.zirconia, and artificial diamond, natural abrasives such as corundum and garnet, and abrasive aids such as cryolite, silica, calcium fluoride, barium sulfate and potassium sulfate. The amount of the abrasive may, for example, about 17 to about 96% by volume, preferably about 23 to about 95% by volume, based on the copolymer of this invention.

The amount of the abrasive aids may, for example, be about 37 to about 96% by volume, preferably about 47 to about 96% by volume, based on the copolymer of this invention.

There can also be used hollowing agents such as alumina hollow spheres; anti-abrasion agents such as molybdenum disulfide, boron nitride, potassium titanate, calcium metasilicate, colloidal silica, colloidal alumina, colloidal titanium, zinc oxide, and tetrafluoroethylene; electrically conductive materials such as carbons (e.g., channel black, furnace black, thermal black, acetylene black and electrical arc black), graphite, silver, gold, nickel, palladium and platinum; and viscosity controlling agents or levelling agents such as titanate-type coupling agents or surface-active agents.

The amounts of these additives may be properly chosen, and are, for example, about 5 to about 86% by volume, preferably about 9 to about 84% by volume, for the hollowing agents; about 1 to about 75% by weight, preferably about 5 to about 60% by weight, for the anti-abrasion agents; about 23 to about 90% by weight, preferably about 28 to about 83% by weight, for the electrically conductive materials; and about 0.1 to about 10% by weight for the viscosity controlling agents or levelling agents, all based on the copolymer of this invention.

As one embodiment of the diallyl terephthalate copolymer composition of this invention, there may be cited a composition composed of the diallyl terephthalate copolymer of this invention, a curing amount of the curing agent, and a diallyl phthalate resin other than the aforesaid copolymer.

The diallyl phthalate resin used in this embodiment may, for example, be a diallyl phthalate prepolymer which is obtained by polymerizing diallyl ortho-phthalate, diallyl isophthalate or diallyl terephthalate, has a number average molecular weight of, for example, 2,000 to 20,000, is solvent-soluble, and fusible under heat, contains allyl groups in the molecule, and can be after-polymerized, or a mixture of this prepolymer with a reactive monomer and/or an unsaturated polyester.

Examples of the reactive monomer are diallyl ortho-, iso- or tere-phthalate monomer, styrene-type monomers such as styrene and α-chlorostyrene, and acrylic acid ester monomers such as methyl (meth)acrylate, butyl(meth)acrylate, propylene glycol di(meth)acrylate, and trimethylolpropane tri(meth)acrylate. The amount of the reactive monomer to be incorporated is preferably not more than 70% by weight of the entire resin portion of the composition. Amounts exceeding 70% by weight are undesirable because the rate of curing is unduly retarded, or internal strains in the molded article increase as a result of an increase in curing shrinkage.

The unsaturated polyester may, for example, be a normally viscous liquid unsaturated polyester having an acid value of about 5 to about 100 and a solid unsaturated polyester having an acid value of about 5 to about 100 and a softening point of not more than 150° C. The preferred amount of the unsaturaed polyester is not more than 80% by weight based on the total resin content of the composition of this invention. Amounts exceeding 80% by weight are objectionable because the properties of the diallyl phthalate are markedly lost, and the resulting molded article has reduced moisture resistance.

As stated hereinabove, the diallyl terephthalate copolymer of this invention is a prepolymer which has unsaturated groups ascribed mainly to the double bond of the allyl group at the structure portion ($C_2$) described in detail with respect ot the characteristic (c) above, in an amount corresponding to an iodine value, measured by the Wijs method, of from 40 to 85, preferably from 45 to 80, and can be further cured to an insoluble infusible three-dimensional polymer. Hence, the copolymer of this invention can be cured irreversibly to a thermosetting resin when it is heated with a suitable amount, for example, about 0.005 to about 6% by weight, preferably about 0.1 to about 6% by weight, based on the weight of the copolymer, of a suitable peroxide such as dicumyl peroxide, tert-butyl perbenzoate or di-tert-butyl peroxide. It can be molded into various molded articles by various molding methods either as such or in the form of a compound composed of it and the various additives exemplified hereinabove.

Examples of peroxides that can be used for curing the copolymer of this invention other than those exemplified hereinabove include ketone peroxides such as methyl ethyl ketone peroxide and cyclohexanone peroxide; peroxy ketals such as 1,1-bis(tert-butylperoxy)-3,3,5-trimethylcyclohexane; hydroperoxides such as cumene hydroperoxide, diacyloyl peroxides or diacyl peroxides such as lauroyl peroxide, benzoyl peroxide and 2,4-dichlorobenzoyl peroxide; peroxy carbonates such as diisopropyl peroxy dicarbonate, and peroxy esters such as tert-butyl peroxy acetate, tert-butylperoxy pivalate, and tert-butylperoxyoctoate. Azo compounds such as azobisisobutylonitrile other than organic peroxides can be similarly used.

Examples of the molding method include a casting method which comprises casting a solution of the copolymer of this invention in a diallyl terephthalate monomer into a mold and curing it; an injection molding or transfer molding method which comprises heating the copolymer of this invention placing the resulting flowable copolymer into a mold, and curing it under heat; a compression molding method which comprises curing the copolymer under heat and pressure in a mold; a laminated plate forming method which comprises dissolving the copolymer in a suitable organic solvent, impregnating it in a fibrous sheet, drying it, and as required under pressure, curing the copolymer in the fibrous sheet; a coating method which comprises coating a fine powder or solution of the copolymer on a substrate and curing it on the substrate; and a decorative plate molding method which comprises impregnating a solution of the copolymer in a printed sheet, drying it, and curing it on the substrate under heat and pressure. The heating temperature for curing in the molding process is, for example, about 120° to about 190° C. When the molding is to be carried out under elevated pressures, pressures of about 5 to about 1000 kg/cm$^2$ may be used.

The diallyl terephthalate copolymer of this invention, either alone, or in combination with the above-exemplified additives or other resins or monomers, can be utilized as molding materials in a wide range of applications.

For example, it is useful in electrical and electronic fields as connectors, commutators of motors, governors, coil bobbins, relays, switches, terminal plates, ignitions, breakers, sockets, binder of sliding resistors, substrates for printed circuit boards, sealing materials for electronic parts and devices, and insulating materials for coil sealing and in other electrical fields; the field of machinery as pistons of plastic brakes; the field of other mechanical devices such as conveyors, valves, switch mechanisms, and plastic balls for bearings; the field of daily necessities such as tableware; the field of medical materials such as trays or containers for drugs or trays or containers which require sterilization with steam.

Furthermore, the copolymer may be impregnated or coated in or on a fibrous sheet such as paper, nonwoven fabrics or glass cloths in the presence or absence of a solvent, and bonding it to a substrate such as wood, paper, metal or another inorganic substrate and curing it, or first curing the copolymer in the fibrous sheet, and bonding the sheet to such a substrate as above. Thus, as such a decorative plate, and the copolymer of this invention is useful in various building materials, furniture, interior decorative materials, cabinets, kitchen facilities, vehicles, interior finishing materials for ships, and in other fields. If the copolymer is impregnated directly in a wooden material and cured, a wood plastic composite (so called WPC) is obtained and can be utilized in the fields of floor materials, decks, eaves, building structural materials and sporting goods. Furthermore, the copolymer of the invention may be formed into a laminated board by impregnating it in a fibrous sheet structure such as a glass cloth and laminating such structures and are useful in fields which require various desirable properties at high temperatures and humidities, for example, in the field of rotating machines as terminal plates, wedges of motors, insulating collars, slot armors and coil separators, the field of stationary instruments for example panels such as duct pieces, barriers, terminal plates, operating rods and power boards, substrates for printed circuit boards and insulating supports of variable condensers.

The copolymer of this invention is also useful in fields which require excellent dimensional stability and good mechanical strength even when changes in temperature and humidity are great, for example, rocket nozzles, air ducts of jet aircraft; fields which require chemical resistance such as component parts of various chemical devices, fields which require weatherability, chemical resistance and mechanical strength such as antenna, skis, ski stocks and fishing rods, field of conductive materials and electrically resistant materials, fields of foams such as flats, thermally insulating materials and sound-proofing materials. It can also be used as paints, magnetic materials, materials for casting molds for molding other resins, hot stamping resins, UV-curable ink, materials for lenses and other optical instruments, binders for glass fibers and carbon fibers, and resins for resists in lithography using light, electron beams or X-rays.

The following examples illustrate in more detail the diallyl terephthalate copolymer of this invention and its production.

EXAMPLES 1 TO 12

A jacketed stainless steel (SUS 304) polymerization vessel having an inside diameter of 600 mm and an inner capacity of 120 liters was used which was equipped with a turbine blade-type variable agitator, a double-tube type supply nozzle for feeding monomers and catalyst, an opening for nitrogen purging, a leak valve, a sampling port, a thermometer and a pressure gauge. The double-tube type supply nozzle for feeding monomers and catalyst was fixed to that part of the body portion of the polymerization vessel which was below the liquid surface. The inside diameter of that part of the outer tube which was before entry into the polymerization vessel was adjusted to 1.5 mm to minimize the residence time in the supply pipe. To cope with nozzle blockage, three such nozzles were provided. The sampling port was also provided at the body portion of the polymerization vessel so that during the polymerization reaction, the liquid phase could be sampled by utilizing the internal pressure of the polymerization vessel. An oil rotating-type vacuum pump and a nitrogen cylinder were connected to the nitrogen purging opening so that the polymerization vessel could be reduced in pressure or purged with nitrogen as desired.

Sixty kilograms of each of the aromatic hydrocarbons of formula (2) (abbreviated HC) shown in Table 1 was charged into the polymerization vessel. The pressure of the inside of the polymerization vessel was reduced by means of a vacuum pump at room temperature, and then the pressure was returned to atmospheric pressure by using nitrogen gas. This operation was repeated three times to replace the air inside the vessel with nitrogen. Then, the pressure was again reduced, and the polymerization vessel was closed. The agitator was started, and while the aromatic hydrocarbon was stirred at 240 rpm, steam was passed through the jacket to elevate the temperature to 140° C.

The rate of stirring was increased to 720 rpm. and diallyl terephthalate and a mixture of di-tert-butyl peroxide (DTBPO) and the aromatic hydrocarbon (HC) of formula (2) in a mole ratio of 0.5:1 were fed simultaneously into the polymerization vessel at predetermined rates from the outside tube of the double tube-type nozzle by means of a pump at a discharge pressure of 70 kg/cm². In Example 5, dicumyl peroxide was used instead of DTBPO. During this time, steam was controlled so that the temperature of the polymerization vessel was maintained at 140° C. The diallyl terephthalate (DAT) of formula (1) to be fed was kept at 15° C., and the mixture of DTBPO and the aromatic hydrocarbon was cooled at 5° C. The pipe leading to the polymerization vessel was maintained cool. The pressure of the polymerization vessel was 0.3 to 2 kg/cm².G.

After predetermined amounts of diallyl terephthalate, the aromatic hydrocarbon and di-tert-butyl peroxide were fed, the supply of steam was stopped, and the stirring speed was lowered to 240 rpm. The polymerization vessel was cooled by passing cooling water through the jacket. After cooling to room temperature, the leak valve was opened, and the pressure was returned to normal atmospheric pressure. The polymerization reaction was thus terminated.

During the polymerization, samples of the reaction mixture were taken out from the sampling port, and the reaction was monitored by the refractive index and GPC.

The rates and amounts of diallyl terephthalate, the aromatic hydrocarbon and di-tert-butyl peroxide fed are shown in Table 1.

The polymerization reaction mixture obtained was evaporated by a thin film-type evaporator to remove volatile materials. The ratio of the unreacted aromatic hydrocarbon in the evaporation residue to the sum of the copolymer and the unreacted diallyl terephthalate was adjusted to 0.3:1 by weight. Then, the evaporation residue was added dropwise to a stirring vessel containing methanol charged thereinto in an amount five times the weight of the fed diallyl terephthalate and stirred to precipitate the resulting copolymer. The precipitated copolymer was well washed with methanol, filtered, dried and pulverized to form a powdery copolymer.

The yields and properties of the copolymers in these examples are shown in Table 1.

COMPARATIVE EXAMPLE 1

A polymer was produced in the same way as in Examples 1 to 12 except that benzene was used instead of the aromatic hydrocarbon of formula (2). The results are shown in Table 1.

COMPARATIVE EXAMPLE 2

A mixture of 10 kg of diallyl terephthalate and 25 g of di-tert-butyl peroxide was reacted with stirring at 120° C. for 2 hours. The reaction mixture was cooled, and then added dropwise to 60 kg of methanol with stirring to precipitate the resulting polymer. The polymer was washed with three 60 kg portions of methanol, filtered, dried and pulverized to form a powdery diallyl terephthalate homopolymer. The properties of the polymer are shown in Table 1.

TABLE 1

| | | Example 1 | Example 2 | Example 3 | Example 4 | Example 5 | Example 6 | Example 7 |
|---|---|---|---|---|---|---|---|---|
| Polymerization reaction | HC | Toluene | Toluene | Xylene | Xylene | Xylene | o-Xylene | p-Xylene |
| | Initial amount of HC fed (kg) | 60 | 60 | 60 | 60 | 60 | 60 | 60 |
| | DAT feed rate (g/hr) | 1506.0 | 947.0 | 275.0 | 165.5 | 272.0 | 494.5 | 211.5 |
| | Feed rate of the mixture of HC and DTBPO (g/hr) | 120 | 120 | 80 | 45 | 90 | 120 | 70 |
| | Amount of DAT fed (moles) | 32 | 45 | 30 | 25 | 22 | 30 | 22 |
| | Amount of HC fed (moles) | 3.8 | 8.5 | 12 | 10 | 10 | 10 | 10 |

TABLE 1-continued

|  |  |  |  |  |  |  |  |  |
|---|---|---|---|---|---|---|---|---|
|  | Amount of DTBPO fed (moles) | 1.9 | 4.25 | 6 | 5 | 5 | 5 | 5 |
|  | Yield of the copolymer (%) | 38 | 60 | 73 | 83 | 74 | 71 | 77 |
| Characteristics of the copolymer | Structure of (a) | Present | Present | Present | Present | Present | Present | Present |
|  | Structure of (b) (the number of the monomeric units of formula (1)) | 10.0 | 7.0 | 3.5 | 3.4 | 3.1 | 4.0 | 3.0 |
|  | Wijs method iodine value (c) | 80 | 64 | 53 | 52 | 52 | 60 | 55 |
|  | True specific gravity at 30° C. (d) | 1.241 | 1.241 | 1.225 | 1.216 | 1.220 | 1.227 | 1.213 |
|  | (e) GPC method $\overline{Mn}$ | 7,200 | 8,700 | 6,800 | 6,500 | 4,600 | 5,000 | 6,000 |
|  | GPC method $\overline{Mw}$ | 73,000 | 181,000 | 118,000 | 114,000 | 102,000 | 154,000 | 124,000 |
|  | Mw/Mn (f) | 10.1 | 20.8 | 17 | 17.5 | 22.0 | 25.7 | 20.7 |
|  | Softening temperature range (°C.) (g) | 71–80 | 103–116 | 80–89 | 74–88 | 74–84 | 86–96 | 72–90 |
|  | Solution viscosity (at 30° C. in methyl ethyl ketone, 50% by weight) (centipoises) (h) | 90 | 114 | 162 | 82 | 153 | 191 | 248 |
|  | (i) Brabender plastography |  |  |  |  |  |  |  |
|  | Brabender melt viscosity (m.g) | 550 | 2500 | 1850 | 1900 | 1900 | 2150 | 950 |
|  | Processing time (minutes) | 30 | 11 | 11 | 11 | 11 | 17 | 33 |

|  |  | Example 8 | Example 9 | Example 10 | Example 11 | Example 12 | Comparative Example 1 | Comparative Example 2 |
|---|---|---|---|---|---|---|---|---|
| Polymerization reaction | HC | m-Xylene | Ethyl-benzene | Iso-propyl-benzene | Diethyl-benzene | Pseudo-cumene | Benzene | — |
|  | Initial amount of HC fed (kg) | 60 | 60 | 60 | 60 | 60 | 60 | — |
|  | DAT feed rate (g/hr) | 522.0 | 247.0 | 243.0 | 190.0 | 330.0 | 379.0 | — |
|  | Feed rate of the mixture of HC and DTBPO (g/hr) | 100 | 60 | 40 | 26 | 45 | 640 | — |
|  | Amount of DAT fed (moles) | 38 | 30 | 31 | 37 | 32 | 40 | — |
|  | Amount of HC fed (moles) | 10 | 10 | 7 | 6 | 6 | 11 | — |
|  | Amount of DTBPO fed (moles) | 5 | 5 | 3.5 | 3 | 3 | 5.5 | — |
|  | Yield of the copolymer (%) | 68 | 82 | 63 | 85 | 96 | 49 | 20 |
| Characteristics of the copolymer | Structure of (a) | Present | Present | Present | Present | Present | Absent | Absent |
|  | Structure of (b) (the number of the monomeric units of formula (1)) | 5.1 | 4.3 | 6.1 | 7.8 | 8.2 | 2.7 | 15.3 |
|  | Wijs method iodine value (c) | 62 | 49 | 58 | 66 | 45 | 73 | 31 |
|  | True specific gravity at 30° C. (d) | 1.222 | 1.215 | 1.225 | 1.221 | 1.211 | 1.252 | 1.238 |
|  | (e) GPC method $\overline{Mn}$ | 6,000 | 5,500 | 4,100 | 4,200 | 4,300 | 11,400 | 7,900 |
|  | GPC method $\overline{Mw}$ | 103,500 | 88,000 | 81,000 | 74,000 | 163,000 | 278,000 | 56,300 |
|  | Mw/Mn (f) | 17.3 | 16.0 | 19.8 | 17.6 | 37.9 | 24 | 7.1 |
|  | Softening temperature range (°C.) (g) | 69–79 | 63–76 | 67–82 | 70–80 | 78–88 | 71–84 | 71–81 |
|  | Solution viscosity (at 30° C. in methyl ethyl ketone, 50% by weight) (centipoises) (h) | 210 | 81 | 95 | 93 | 295 | 122 | 98 |
|  | (i) Brabender plastography |  |  |  |  |  |  |  |
|  | Brabender melt viscosity (m.g) | 1500 | 550 | 850 | 950 | 1250 | 2500 | 1300 |
|  | Processing time (minutes) | 21 | 40 | 28 | 35 | 52 | * | 5 |

EXAMPLES 13 TO 24 AND COMPARATIVE EXAMPLES 3 AND 4

(a) Preparation of a non-filled compound

One kilogram of each of the copolymers obtained in Examples 1 to 12 was well mixed with 20 g of dicumyl peroxide, and the mixture was then kneaded on a roll mill. The kneading was carried out for 5 minutes while maintaining the temperature of the front roll at 90° to 100° C., and the temperature of the rear roll at 60° to 80° C. It was taken in sheet form from the rolls. The sheet was allowed to cool, coarsely pulverized, and then pulverized in a Henschel mixer.

(b) Compression molding of the non-filled compound

Twenty to thirty grams of the non-filled compound obtained above was molded into a nearly disc-like tablet having a diameter of 50 mm and a thickness of 10 mm by means of a hand press using a mold. The tablet was pre-heated to about 80° C. by a high frequency pre-heater, and then immediately placed at the center of the cavity of a compression molding mold adjusted to a predetermined temperature, and molded by an automatic press for a predetermined time at a mold temperature of 160° C. and a pressure of 100 kg/cm² to form a disc-like article having a diameter of 100 mm and a thickness of about 2 mm.

The compression molding times and the properties of the molded articles are summarized in Table 2.

The properties of the molded articles were measured by the methods described after Table 2.

For comparison, a non-filled compound was prepared, compression-molded and tested in the same way as in Examples 13 to 24 except that the polymer obtained in Comparative Example 1 was used. The results are shown in Table 2 (Comparative Example 3).

Furthermore, for comparison, the above procedure was repeated except that the polymer obtained in Comparative Example 2 was used. The results are also shown in Table 2 (Comparative Example 4).

TABLE 2

| Run No. | | Example 13 | Example 14 | Example 15 | Example 16 | Example 17 | Example 18 | Example 19 |
|---|---|---|---|---|---|---|---|---|
| Copolymer used | | (Example 1) | (Example 2) | (Example 3) | (Example 4) | (Example 5) | (Example 6) | (Example 7) |
| Molding time (minutes) | | 15 | 20 | 25 | 25 | 20 | 18 | 25 |
| Properties of the molded article | Rockwell hardness (M scale) | 114 | 100 | 104 | 101 | 102 | 104 | 102 |
| | Thickness of the sample (mm) | 2.04 | 2.05 | 1.97 | 1.99 | 2.00 | 1.99 | 2.03 |
| | Specific gravity | 1.254 | 1.231 | 1.223 | 1.222 | 1.227 | 1.228 | 1.215 |
| | Mold shrinkage (%) | 1.15 | 1.30 | 1.16 | 1.20 | 1.30 | 1.15 | 1.21 |
| | Flexural strength (kg/mm²) | 6.4 | 6.7 | 6.6 | 6.8 | 6.8 | 6.7 | 7.0 |
| | Flexural modulus (kg/mm²) | 259 | 195 | 261 | 253 | 239 | 247 | 240 |
| | Falling weight impact value (mm) | 108 | 183 | 178 | 172 | 189 | 134 | 162 |
| | DSC reaction conversion (%) | 92 | 93 | 91 | 94 | 90 | 84 | 95 |
| | Water absorption on boiling (%) | 0.49 | 0.48 | 0.49 | 0.40 | 0.45 | 0.40 | 0.50 |
| | Heat resistance (days) | 21 | 22 | 22 | 22 | 22 | 22 | 22 |
| | Volume resistivity (ohm-cm) | $4.8 \times 10^{16}$ | $5.5 \times 10^{16}$ | $4.1 \times 10^{16}$ | $6.0 \times 10^{16}$ | $5.5 \times 10^{16}$ | $5.5 \times 10^{16}$ | $4.8 \times 10^{16}$ |
| | Dielectric constant (1MHz) | 2.8 | 2.7 | 3.0 | 3.1 | 3.1 | 3.0 | 3.1 |
| | Dielectric loss tangent (1 MHz) | 0.010 | 0.010 | 0.012 | 0.012 | 0.013 | 0.013 | 0.012 |
| | Dielectric breakdown strength (KV/mm) | 18.8 | 18.0 | 17.4 | 17.5 | 17.8 | 18.0 | 18.6 |
| | Arc resistance (sec) | 135 | 132 | 127 | 121 | 130 | 131 | 132 |

| | | Example 20 | Example 21 | Example 22 | Example 23 | Example 24 | Comparative Example 3 | Comparative Example 4 |
|---|---|---|---|---|---|---|---|---|
| Copolymer used | | (Example 8) | (Example 9) | (Example 10) | (Example 11) | (Example 12) | (Comparative Example 1) | (Comparative Example 2) |
| Molding time (minutes) | | 25 | 20 | 25 | 20 | 40 | 20 | 15 |
| Properties of the molded article | Rockwell hardness (M scale) | 103 | 100 | 106 | 104 | 101 | cracked | cracked |
| | Thickness of the sample (mm) | 2.03 | 2.10 | 1.98 | 2.01 | 2.03 | 2.07 | 2.00 |
| | Specific gravity | 1.225 | 1.211 | 1.238 | 1.230 | 1.201 | 1.252 | 1.253 |
| | Mold shrinkage (%) | 1.23 | 1.30 | 1.15 | 1.16 | 1.30 | 1.23 | 1.24 |
| | Flexural strength (kg/mm²) | 6.6 | 7.4 | 6.7 | 6.8 | 6.7 | 4.4 | 4.4 |
| | Flexural modulus (kg/mm²) | 248 | 250 | 250 | 243 | 220 | 244 | 299 |
| | Falling weight impact value (mm) | 157 | 157 | 152 | 165 | 108 | <20 | 24 |
| | DSC reaction conversion (%) | 92 | 89 | 94 | 93 | 97 | 94 | 94 |
| | Water absorption on bioling (%) | 0.44 | 0.41 | 0.42 | 0.44 | 0.41 | 0.66 | 0.52 |
| | Heat resistance (days) | 22 | 22 | 21 | 22 | 43 | 10 | 12 |
| | Volume resistivity (ohm-cm) | $4.2 \times 10^{16}$ | $5.3 \times 10^{16}$ | $4.0 \times 10^{16}$ | $5.4 \times 10^{16}$ | $3.8 \times 10^{16}$ | $2.0 \times 10^{16}$ | $5.4 \times 10^{16}$ |
| | Dielectric constant (1MHz) | 3.0 | 3.1 | 2.9 | 3.0 | 2.8 | 3.2 | 3.3 |
| | Dielectric loss tangent (1 MHz) | 0.012 | 0.014 | 0.016 | 0.016 | 0.015 | 0.016 | 0.021 |
| | Dielectric breakdown strength (KV/mm) | 17.5 | 18.8 | 17.5 | 18.0 | 18.8 | 17.7 | 18.7 |
| | Arc resistance (sec) | 133 | 128 | 129 | 131 | 128 | 125 | 137 |

Methods of testing the properties of molded articles (1) Rockwell hardness

Measured at room temperature using a Rockwell hardness tester (M scale). The arithmeric average value of three measured values is determined.

(2) Thickness of the test sample

Measured by using a micrometer at the central part of the sample.

(3) Specific gravity

Three test samples of any desired shape are cut out from a molded article, and the weight (a grams) of each of the test samples is measured. The weight (c grams) of a jig for suspending the test sample is measured in water. Then, the test sample is suspended by the jig, and the total weight (b grams) of the jig and the test sample in water is measured. The specific gravity is calculated in accordance with the following equation.

$$\text{Specific gravity} = a/(a-b+c)$$

The measurement is carried out at $25 \pm 0.5°$ C., and the arithmetic average of the specific gravities of the three samples is determined.

(4) Mold shrinkage

The diameter of a molded article sample is measured by a micrometer, and the difference between this diameter and the diameter (100 mm) of the mold cavity is calculated. This difference is divided by the diameter of the mold cavity and then multiplied by 100. The product is defined as the mold shrinkage (5) Flexural strength Test sample:
Six test samples having a width of about 25 mm are cut out from three molded articles by a diamond cutter.

Tester:
TENSILON/UTM-111-500 (made by Toyo-Baldwin Co.)

Measuring conditions:
Load cell 50 kg; supporting width 60 mm; crosshead speed 1 mm/min.

The flexural strength is calculated in accordance with the formula described in JIS K6918, and the arithmetic average of 6 replicates is determined.

(6) Falling weight impact value

Thirty-six test pieces are cut out from two molded articles by a diamond cutter. The Du Pont type falling ball tester (load 500 g; flat supporting stand; impact head ½ inch R) was used as a tester, and the 50% break height is determined by the Dixon-Mood method (see JIS K7211).

(7) DSC reaction conversion

The quantity of heat generated is measured by a differential scanning calorimeter (DSC-1B made by Perkin-Elmer Company) using a sample obtained by finely pulverizing a molded article and a non-filled compound before molding. The DSC reaction conversion is calculated from the following equation.

$$\text{DSC reaction conversion (\%)} = \frac{(A - B)}{A} \times 100$$

where

A is the quantity of heat (cal/g) generated by the non-filled compound, and

B is the quantity of heat (cal/g) generated by the finely pulverized molded article.

(8) Water absorption on boiling

Measured in accordance with JIS K6918 except that a disc-like sample having a diameter of 100 mm and a thickness of 2 mm is used.

(9) Heat resistance

Three molded articles allowed to stand for 2 hours in a constant temperature vessel at 150° C. and then allowed to cool in a desiccator are used. The initial weight of each of the molded articles is measured. These test samples are allowed to stand for a suitable period of time in a constant temperature vessel adjusted to $240 \pm 2°$ C., and allowed to cool in a desiccator. The weight of each of the test samples is then measured. When at this time, the average of the weight losses of the three test samples does not reach 10% of the initial weight, these test samples are again left to stand for a suitable period of time in a constant temperature vessel at $240 \pm 2°$ C., and their weight losses are again measured. This operation is repeated until the average of the weight losses of the three test samples reaches 10%. The total days required for this test is determined and defined as the heat resistance.

(10) Electrical properties
 (a) Volume resistivity Measured in accordance with JIS K6918.
 (b) Dielectric constant Measured in accordance with JIS K6918 except that a sample having a thickness of 2 mm is used.
 (c) Dielectric loss tangent Measured in accordance with JIS K6918 using the same sample as in (b) above.
 (d) Dielectric breakdown strength Measured in accordance with JIS K6911 (the short time method).
 (e) Arc resistance Measured in accordance with JIS K6918 except that a sample having a thickness of 2 mm is used.

EXAMPLES 25 AND 26

(a) Preparation of a full compound

One kilogram of each of the copolymers obtained in Examples 2 and 4 was compounded in accordance with the following recipe and a full compound was prepared in the same way as described in Examples 13 to 24 with regard to the non-filled compound.

| Compounding recipe | |
|---|---|
| Ingredient | Amount (parts by weight) |
| Copolymer | 100 |
| Glass chopped strand* | 60 |
| Calcium carbonate | 40 |
| Dicumyl peroxide | 2 |
| Calcium stearate | 1 |
| Methacryloxysilane | 0.6 |
| Hydroquinone | 0.01 |

*a product of Asahi Fiber Glass Co., Ltd.

(b) Compression molding of the full compound

The full compound was molded, and the properties of the molded articles were measured, in the same way as in the case of the non-filled compound described in Examples 13 to 24.

The compression molding times and the properties of the molded articles are shown in Table 3 below.

TABLE 3

| Run No. | | Example 25 | Example 26 |
|---|---|---|---|
| Copolymer used | | (Example 2) | (Example 4) |
| Molding time (minutes) | | 20 | 15 |
| Properties | Rockwell hardness | 102 | 105 |

TABLE 3-continued

| Run No. Copolymer used Molding time (minutes) | | Example 25 (Example 2) 20 | Example 26 (Example 4) 25 |
|---|---|---|---|
| of the molded article | (M scale) Thickness of the sample (mm) | 2.01 | 1.98 |
| | Specific gravity | 1.643 | 1.651 |
| | Dimensional shrinkage (%) | 0.28 | 0.33 |
| | Flexural strength (kg/mm$^2$) | 9.4 | 9.4 |
| | Flexural modulus (kg/mm$^2$) | 578 | 656 |
| | Falling weight impact value (mm) | 405 | 388 |
| | DSC reaction conversion (%) | 93 | 93 |
| | Water absorption on boiling (%) | 0.28 | 0.29 |
| | Heat resistance (days) | 21 | 22 |
| | Volume resistivity (ohm-cm) | 5.6 × 10$^{15}$ | 7.3 × 10$^{15}$ |
| | Dielectric constant (1 MHz) | 4.2 | 4.1 |
| | Dielectric tangent (1 MHz) | 0.013 | 0.012 |
| | Dielectric breakdown strength (KV/mm) | 22.1 | 21.8 |
| | Arc resistance (sec) | 131 | 128 |

EXAMPLE 27

The full compound obtained in Example 26 was injection-molded, and the properties of the molded articles were measured. The injection molding conditions were as shown below.

Machine:
Minisuper 60 (Meiki Seisakusho Co., Ltd.)
Number of injection molds:
One sample for JIS flexural strength,
One sample for JIS impact strength,
One sample for JIS heat distortion temperature.

| Mold temperature: | |
|---|---|
| (Fixed side) | 170° C. |
| (Movable side) | 170° C. |
| Cylinder temperature: | |
| Front portion | 100° C. |
| Rear portion | 40° C. |
| Clamping pressure: | 1300 kg/cm$^2$ |
| Amount of injection: | 105 cc |
| Injection pressure: | 800 kg/cm$^2$ |
| Time during which the injection pressure is maintained: | 15 seconds |
| Injection time: | 3–4 seconds |
| Screw rotating speed: | 85 rpm |
| Curing time: | 90 seconds |

The properties of the molded articles are shown in Table 4.

The flexural strength, Charpy impact strength and heat distortion temperature were measured in accordance with JIS K6918.

TABLE 4

| Flexural strength (kg/mm$^2$) | 13.3 |
|---|---|
| Flexural modulus (kg/mm$^2$) | 941 |
| Heat distortion temperature (°C.) | 210 |
| Charpy impact strength (Kgf-cm/cm$^2$) | 4.1 |

EXAMPLES 28 TO 35 AND COMPARATIVE EXAMPLES 5 TO 10

Each of the resin compositions shown in Table 6 comprising each of the copolymers shown in Table 5 was well mixed with 2 parts by weight of dicumyl peroxide as a curing agent. The mixture was kneaded on a roll mill (front roll 90°–100° C.; rear roll 60° to 80° C.; kneading time 6 minutes) to form a sheet. The sheet was pulverized by a Henschel mixer to form a compound.

Twenty to thirty grams of the compound was molded into a nearly disc-like tablet having a diameter of 50 mm and a thickness of 10 mm by a hand press using a mold. The tablet was pre-heated to about 80° C. by a high frequency pre-heater, immediately then placed at the center of the cavity of a compression molding mold adjusted to a predetermined temperature, and molded by an automatic pressure for 10 minutes at a mold temperature of 160° C. and a pressure of 100 kg/cm$^2$ to form a disc-like molded article having a diameter of about 100 mm and a thickness of 2 mm. The molded article was tested by general testing methods in accordance with JIS K6911, a falling weight impact testing method in accordance with JIS K7211 and a heat resistance testing method. The results are shown in Table 6.

The falling weight impact test was carried out in the same way as described hereinabove after Table 2. The heat resistance test was the same as described hereinabove after Table 2 except the temperature at which the test sample was left to stand was changed to 200±2° C.

TABLE 5

| | Copolymer No. 1 | Copolymer No. 2 |
|---|---|---|
| Comonomer of formula (2) | Toluene | Xylene |
| Structure of (a) | Present | Present |
| Structure of (b) (the number of monomeric units of formula (I)) | 7.0 | 3.5 |
| Iodine value by the Wijs method (c) | 64 | 53 |
| True specific gravity at 30° C. (d) | 1.241 | 1.225 |
| (e) GPC method Mn | 8,700 | 6,800 |
| GPC method Mw | 181,000 | 118,000 |
| Mw/Mn (f) | 20.8 | 17 |
| Softening temperature range (°C.) (g) | 103–116 | 80–89 |
| Solution viscosity (h) (centipoises; determined at 30° C. for 50 wt. % methyl ethyl ketone solution) | 114 | 162 |
| (i) Brabender Plastograph | | |
| Brabender melt viscosity (m · g) | 2,500 | 1,850 |
| Processing time (minutes) | 11 | 11 |

TABLE 6

| | (Compounding: parts by weight) | | | | | | | | | | | | | |
|---|---|---|---|---|---|---|---|---|---|---|---|---|---|---|
| | Example | | | | | | | | Comparative Example | | | | | |
| | 28 | 29 | 30 | 31 | 32 | 33 | 34 | 35 | 5 | 6 | 7 | 8 | 9 | 10 |
| Diallyl orthophthalate prepolymer (1) | 98 | 80 | 50 | 10 | | 60 | 90 | | 95 | 75 | | | | |

TABLE 6-continued

| | (Compounding: parts by weight) | | | | | | | | | | | | |
|---|---|---|---|---|---|---|---|---|---|---|---|---|---|
| | Example | | | | | | | | Comparative Example | | | | |
| | 28 | 29 | 30 | 31 | 32 | 33 | 34 | 35 | 5 | 6 | 7 | 8 | 9 | 10 |
| Diallyl isophthalate prepolymer (2) | | | | | 50 | | | | | | 100 | | | |
| Diallyl terephthalate prepolymer (3) | | | | | | 50 | | | | | | 100 | | |
| Unsaturated polyester (4) | | | | | | | 20 | | | 25 | | | | |
| Diallyl orthophthalate monomer | | | | | | | | 5 | 5 | | | | | |
| Copolymer No. 1 | | 20 | | | | | | 5 | | | | | 100 | |
| Copolymer No. 2 | 2 | | 50 | 90 | 50 | 50 | 20 | | | | | | | 100 |
| Properties of the molded article | | | | | | | | | | | | | | |
| Rockwell hardness (M scale) | 111 | 109 | 107 | 105 | 112 | 114 | 110 | 111 | 111 | 111 | 116 | Cracked | 100 | 104 |
| Flexural strength (kg/mm²) | 8.9 | 10.2 | 10.2 | 9.5 | 10.1 | 8.0 | 10.4 | 9.0 | 7.6 | 3.3 | 7.5 | 4.5 | 1.7 | 1.6 |
| Flexural modulus (kg/mm²) | 370 | 358 | 345 | 296 | 345 | 285 | 360 | 372 | 370 | 375 | 370 | 300 | 195 | 161 |
| Boiling water absorption (%) | 0.42 | 0.43 | 0.41 | 0.47 | 0.45 | 0.50 | 0.50 | 0.39 | 0.41 | 0.52 | 0.41 | 0.52 | 0.48 | 0.49 |
| Falling weight impact value (mm) | 145 | 185 | 190 | 188 | 120 | 116 | 190 | 180 | 70 | 80 | 30 | 24 | 83 | 78 |
| Heat resistance (hours) | 400 | 1000 | 1600 | 4100 | 3700 | 7000 | 900 | 390 | 288 | 260 | 2880 | 7500 | 4500 | 4450 |

Note (1) Iodine value 58.0; solution viscosity at 30° C. for 50% methyl ethyl ketone solution 96.0 cps.

(2) Iodine value 83.0; softening temperature range 60°–73° C.

(3) Iodine value 91.0; softening temperature range 71°–81° C.

(4) A polyester having an acid value of 28.0 and a softening temperature of 80° C. obtained by dehydrocondensation of 0.5 mole of phthalic anhydride, 0.5 mole of maleic anhydride and 1 mole of propylene glycol by the melting method.

EXAMPLES 36 AND 37 AND COMPARATIVE EXAMPLES 11 AND 12

About 1 kg of a full compound was prepared in each run in accordance with the following compounding recipe using each of the resins or resin mixtures in Examples 28 and 30 and Comparative Examples 5 and 10.

| | Compounding recipe |
|---|---|
| Ingredient | Amount (parts by weight) |
| Resin | 100 |
| Dicumyl peroxide | 2 |
| Hydroquinone | 0.01 |
| Methacryloxysilane | 0.6 |
| Calcium stearate | 2 |
| Glass chopped strand* | 60 |
| Calcium carbonate | 40 |

*A product of Asahi Fiber Glass Co., Ltd.

In the above compounding recipe, dicumyl peroxide, hydroquinone and methacryloxyslane together with the resin were dissolved in 500 g of acetone. The solution was charged into a 3-liter mixing and grinding machine. Then, calcium stearate and calcium carbonate which had been well mixed were fed into the machine, and the entire ingredients were mixed for about 5 minutes. Then, the glass chopped strand was fed, and further mixed the resulting mixture for 10 minutes. The final mixture was left to stand for a day and night to volatilize the residual acetone. The mixture was then kneaded on a roll mill (front roll 100° C., rear roll 90° C.) for about 10 minutes, and the resulting sheet was taken out from the rolls. The compound in sheet form was pulverized in a feather mill equipped with a screen having a diameter of 2 mm to form a granular compound.

The compound obtained in each run was molded in the same way as in Examples 28 to 35, and the properties of the molded article were tested. The results are shown in Table 7.

TABLE 7

| | Example | | Comparative Example | |
|---|---|---|---|---|
| Resin composition used | 36 Example 28 | 37 Example 30 | 11 Comparative Example 5 | 12 Comparative Example 10 |
| Brabender characteristics of the compound at 120° C. | | | | |
| Brabender melt viscosity (m · g) | 1200 | 1300 | 1200 | 400 |
| Processing time (minutes) | 45 | 45 | 45 | 43 |
| Properties of the molded article | | | | |
| Rockwell hardness (M scale) | 109 | 108 | 109 | 107 |
| Mold shrinkage (%) | 0.27 | 0.28 | 0.27 | 0.29 |
| Flexural strength (kg/mm²) | 12.0 | 13.8 | 10.3 | 10 |
| Flexural modulus (kg/mm²) | 725 | 705 | 730 | 680 |
| Boiling water absorption (%) | 0.24 | 0.23 | 0.25 | 0.23 |
| Volume resistivity (ohm-cm) | $1.0 \times 10^{16}$ | $1.5 \times 10^{15}$ | $1.2 \times 10^{16}$ | $1.5 \times 10^{15}$ |
| Dielectric constant (1 MHz) | 4.2 | 4.2 | 4.3 | 4.1 |
| Dielectric loss tangent (1 MHz) | 0.015 | 0.013 | 0.016 | 0.012 |
| Dielectric breakdown strength (KV/mm) | 21.5 | 21.8 | 21.2 | 21.8 |
| Arc resistance (sec) | 130 | 130 | 128 | 131 |
| Falling weight impact value (mm) | 480 | 460 | 305 | 240 |

TABLE 7-continued

| Resin composition used | Example 36 Example 28 | Example 37 Example 30 | Comparative Example 11 Comparative Example 5 | Comparative Example 12 Comparative Example 10 |
|---|---|---|---|---|
| Heat resistance* (hr) | 400 | 1590 | 290 | 4600 |

*The total time which elapsed until the weight loss reached 5.1% of the initial weight.

EXAMPLES 38 TO 47 AND COMPARATIVE EXAMPLES 13 TO 15

In each run, each of the copolymers of the invention shown in Table 8 was blended with the materials shown in Table 9 and they were kneaded at 90° C. for 10 minutes on a roll mill to form a molding material. The molding material was molded by a two-stage molding method described below to obtain a foamed article having a surface gloss and an expansion ratio of about 4 and containing fine closed cells.

Specifically, the molding material was fed into a mold for the production of a disc-like plate having a diameter of 100 mm and pressed to a thickness of 2 mm at 140° C. and 100 kg/cm². This pressure was maintained for 5 minutes. Then, the mold was opened until the thickness of the article became 8 mm. The temperature was raised to 160° C., and the article was maintained at this temperature for 30 minutes. Subsequently, the mold was opened and the molded article was withdrawn.

For comparison, the compositions shown in Table 9 which did not contain the copolymers were kneaded, and molded and expanded in the same way as above.

The properties of the articles were measured by the following methods.

Flexural strength

A test sample having a size of 8×10×80 mm was cut out from the resulting foamed article, and its flexural strength was measured under the following conditions.

Distance between supporting points: 60 mm
Crosshead speed: 4 mm/min.

Boiling water absorption

The resulting foamed article was immersed in boiling water for 2 hours, and then cooled with tap water for 1 hour. The sample was pulled out of the water and its surface was quickly wiped with absorbent cotton. Immediately then, the weight of the sample was measured, and based on the difference between its weight and the weight before boiling, its water absorption on boiling was calculated.

Oil resistance

The foamed article was immersed for 1440 hours in a brake oil (DOT3, manufactured by Mobile Oil Co.) kept at 160° C., and an increase in weight after immersing was measured.

The results are also shown in Table 9.

TABLE 8

|  | Copolymer No. 3 | Copolymer No. 4 |
|---|---|---|
| Comonomer of formula (2) | Toluene | Xylene |
| Structure of (a) | Present | Present |
| Structure of (b) (the number of monomeric units of formula (1)) | 10.0 | 3.5 |
| Iodine value by the Wijs method (c) | 80 | 53 |
| True specific gravity at 30° C. (d) | 1.241 | 1.225 |
| (e) GPC method $\overline{Mn}$ | 7,200 | 6,800 |
| GPC method $\overline{Mw}$ | 73,000 | 118,000 |
| $\overline{Mw}/\overline{Mn}$ (f) | 10.1 | 17 |
| Softening temperature range (°C.) (g) | 71–80 | 80–89 |
| Solution viscosity (h) (centipoises; determined at 30° C. for 50 wt. % methyl ethyl ketone solution) | 90 | 162 |
| (i) Brabender Plastograph | | |
| Brabender melt viscosity (m · g) | 550 | 1,850 |
| Processing time (minutes) | 30 | 11 |

TABLE 9

| | | Example | | | | | | | | | | Comparative Example | | |
|---|---|---|---|---|---|---|---|---|---|---|---|---|---|---|
| | | 38 | 39 | 40 | 41 | 42 | 43 | 44 | 45 | 46 | 47 | 13 | 14 | 15 |
| Composition (parts by weight) | Copolymer No. 3 | 100 | | | 100 | 100 | | | 100 | 100 | | | | |
| | Copolymer No. 4 | | 100 | 100 | | | 100 | 100 | | | 100 | | | |
| | Diallyl terephthalate monomer | | 5 | 5 | 5 | 5 | 5 | 5 | | 2 | | 10 | 5 | 10 |
| | Diallyl isophthalate prepolymer (*1) | | | | | | | | 50 | 30 | 150 | 90 | 95 | 90 |
| | SBR (*2) | | 30 | | | | | | 50 | | 50 | | | |
| | NBR (*3) | | | 50 | | | | | | 30 | | | | 20 |
| | Chloroprene rubber (*4) | | | | 40 | | | | | | | | | |
| | Epichlorohydrin rubber (*5) | | | | | 10 | | | | | | 30 | | |
| | Chlorinated polyethylene (*6) | | | | | | 10 | | | | | | | |
| | Polyethylene (*7) | | | | | | | 15 | | | | | 15 | |
| | Carbon black (*8) | 50 | 50 | 50 | 50 | 50 | 50 | 50 | | | | 50 | | |
| | CaCO₃ (*9) | | | | | | | | 50 | | 50 | | 50 | |
| | Glass staples | | | | | | | | | 50 | | | | 50 |
| | Dinitrosopentamethyl-tetramine | 10 | 10 | 10 | 10 | 10 | 10 | 10 | 10 | 10 | 10 | 10 | 10 | 10 |
| | Urea | 5 | 5 | 5 | 5 | 5 | 5 | 5 | 5 | 5 | 5 | 5 | 5 | 5 |
| | Dicumyl peroxide | 2 | 2 | 2 | 2 | 2 | 2 | 2 | 2 | 2 | 2 | 2 | 2 | 2 |
| | Hydroquinone | 0.01 | 0.01 | 0.01 | 0.01 | 0.01 | 0.01 | 0.01 | 0.01 | 0.01 | 0.01 | 0.01 | 0.01 | 0.01 |
| | Calcium stearate | 2 | 2 | 2 | 2 | 2 | 2 | 2 | 2 | 2 | 2 | 2 | 2 | 2 |
| | Specific gravity | 0.35 | 0.34 | 0.34 | 0.36 | 0.36 | 0.36 | 0.35 | 0.34 | 0.37 | 0.35 | 0.36 | 0.36 | 0.37 |

TABLE 9-continued

| | | Example | | | | | | | | | | Comparative Example | | |
|---|---|---|---|---|---|---|---|---|---|---|---|---|---|---|
| | | 38 | 39 | 40 | 41 | 42 | 43 | 44 | 45 | 46 | 47 | 13 | 14 | 15 |
| Properties | Flexural strength (KG/mm²) | 2.8 | 3.0 | 3.4 | 3.3 | 2.9 | 2.9 | 2.8 | 2.9 | 6.8 | 2.6 | 2.7 | 2.6 | 5.6 |
| | Boiling water absorption (%) | 0.09 | 0.11 | 0.11 | 0.10 | 0.09 | 0.08 | 0.08 | 0.09 | 0.12 | 0.11 | 0.12 | 0.12 | 0.12 |
| | Oil resistance (swelling degree, %) | 2.1 | 5.1 | 4.9 | 5.5 | 2.8 | 2.4 | 3.0 | 7.5 | 4.3 | 7.8 | 21.0 | 18.3 | 23.1 |

(*1) Iodine value 82.4; solution viscosity at 30° C. for 50% MEK solution 65 cps; a product of Osaka Soda Co., Ltd.
(*2) JSR-1502, a product of Japan Synthetic Rubber, Co., Ltd.
(*3) JSR-PN30A, a product of Japan Synthetic Rubber Co., Ltd.
(*4) Neoprene W (tradename, a product of Showa Neoprene Co., Ltd.)
(*5) Epichlomer HG (a tradename for a product of Osaka Soda Co., Ltd.)
(*6) Daisolac G 235 (a tradename for a product of Osaka Soda Co., Ltd.)
(*7) Sumikathene G202 (a tradename for a product of Sumitomo Chemical Co., Ltd.)
(*8) HAF (Asahi #70, a tradename for a product of Asahi Carbon Co., Ltd.)
(*9) NS-100 (a product of Nitto Funka Kogyo Co., Ltd.)
(*10) Manufactured by Asahi Fiber Glass Co., Ltd.

What is claimed is:

1. A diallyl terephthalate copolymer derived from diallyl terephthalate represented by the following formula

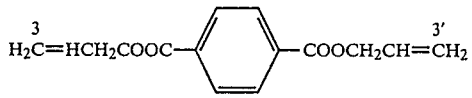

(1)

and an aromatic benzyl hydrocarbon having at least one hydrogen atom at the benzyl position and represented by the following formula

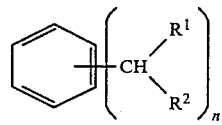

(2)

wherein each of $R^1$ and $R^2$ represents a member selected from the class consisting of a hydrogen atom and lower alkyl groups, and n is an integer of 1 to 3, said copolymer having the following characteristics (a) to (f):

(a) the copolymer has such a structure wherein one monomeric unit of formula (2) is bonded to the allyl group of the monomeric unit of formula (1) at

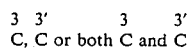

through a carbon-carbon bond at the benzyl position, (b) the number of the monomeric units of formula (1) at a carbon-carbon bonded molecular chain segment formed from the allyl groups of the monomeric unit of formula (1) in the copolymer is from 3 to 11, (c) the copolymer has a degree of unsaturation, measured by the Wijs method, of from 40 to 85, (c) the copolymer has a true specific gravity at 30° C. of from 1.20 to 1.25, (e) the copolymer has a number average molecular weight ($\overline{Mn}$) of from 4,000 to 10,000 and a weight average molecular weight ($\overline{Mw}$) of from 70,000 to 200,000 measured by gel-permeation chromatography (GPC) and calculated as polystyrene, and (f) the copolymer has a molecular weight distribution, represented by the ratio of $\overline{Mn}$ to $\overline{Mw}$, of from 10 to 40.

2. The copolymer of claim 1 which, as a further characteristic (g), has a softening temperature range of from about 50° C. to about 120° C.

3. The copolymer of claim 1 or 2 which, as a further characteristic (h), has a viscosity of from 30 to 300 centipoises, determined at 30° C. as a 50% by weight methyl ethyl ketone solution.

4. The copolymer of claim 1 or 2 which, as a further characteristic (i), has a Brabender melt viscosity, measured by Brabender plastography, of from 250 to 2,600 m.g., and a processing time, measured by Brabender plastography, of from 5 to 65 minutes.

5. A resin composition composed of the diallyl terephthalate copolymer of claim 1 and a curing amount of a curing agent.

6. The resin composition of claim 5 wherein the amount of the curing agent is about 0.005 to about 6% by weight based on the weight of the copolymer.

7. The resin composition of claim 6 which as a further characteristic (i) has a Brabender melt viscosity, measured by Brabender plastography, of from 250 to 2,600 m.g., and a processing time, measured by a Brabender plastography, of from 5 to 65 minutes.

8. The copolymer of claim 1 wherein (b) the number of the monomeric units of formula (1) having a carbon-carbon bonded molecular chain segment formed of the allyl groups of the monomeric unit of formula (1) and the copolymer is from 3 to 10; (c) the iodine value is from 45 to 80; and (d) the true specific gravity is from 1.21 to 1.25.

9. The copolymer of claim 1 wherein the aromatic hydrocarbon represented by the formula (2) is selected from the group consisting of toluene, ethylbenzene, n-propylbenzene, isopropylbenzene, n-butylbenzene, isobutylbenzene, sec-butylbenzene, n-amylbenzene, sec-amylbenzene, isoamylbenzene, (2-methylbutyl)-benzene, o-xylene, m-xylene, p-xylene, xylene isomeric mixture, pseudocumene, 1,2-diethylbenzene, 1,3-diethylbenzene, 1,4-diethylbenzene, 1,2-dipropylbenzene, 1,3-dipropylbenzene, 1,4-dipropylbenzene, diisopropylbenzenes, p-cymene, 1,2-dibutylbenzene, 1,3-dibutylbenzene, 1,4-dibutylbenzene, 1,2-diisoamylbenzene, 1,3-diisoamylbenzene, 1,4-diisoamylbenzene, and 1,2,3-trimethylbenzene.

* * * * *

UNITED STATES PATENT AND TRADEMARK OFFICE
CERTIFICATE OF CORRECTION

PATENT NO. : 4,518,764
DATED      : May 21, 1985
INVENTOR(S): TANAKA ET AL.

It is certified that error appears in the above-identified patent and that said Letters Patent is hereby corrected as shown below:

IN THE SPECIFICATION
    column 13, line 9, insert --f-- after "coefficient".

IN THE CLAIMS
    claim 1, line 27, delete "30°C.", insert --25°C.--.

Signed and Sealed this

Eighth Day of October 1985

[SEAL]

Attest:

DONALD J. QUIGG

Attesting Officer

Commissioner of Patents and
Trademarks—Designate